(12) United States Patent
Danner et al.

(10) Patent No.: US 7,733,554 B2
(45) Date of Patent: Jun. 8, 2010

(54) ELECTRO-OPTIC DISPLAYS, AND MATERIALS AND METHODS FOR PRODUCTION THEREOF

(75) Inventors: Guy M. Danner, Somerville, MA (US); Shamus Ford Patry, Worcester, MA (US); Harit Doshi, North Chelmsford, MA (US); Steven J. O'Neil, Pembroke, MA (US)

(73) Assignee: E Ink Corporation, Cambridge, MA (US)

( * ) Notice: Subject to any disclaimer, the term of this patent is extended or adjusted under 35 U.S.C. 154(b) by 502 days.

(21) Appl. No.: 11/682,409

(22) Filed: Mar. 6, 2007

(65) Prior Publication Data

US 2007/0211331 A1 Sep. 13, 2007

Related U.S. Application Data

(60) Provisional application No. 60/767,171, filed on Mar. 8, 2006.

(51) Int. Cl.
*G02F 1/03* (2006.01)
*G02B 26/00* (2006.01)

(52) U.S. Cl. ............... 359/245; 359/296; 359/265; 345/107; 428/41.8; 445/23

(58) Field of Classification Search ............... 359/245, 359/265–275, 296, 321, 322; 345/55, 107; 428/40.1, 41.8, 98, 220, 354; 445/23, 25; 204/450; 156/60, 256; 438/22; 324/537
See application file for complete search history.

(56) References Cited

U.S. PATENT DOCUMENTS 3,668,106 A 6/1972 Ota
3,756,693 A 9/1973 Ota
3,767,392 A 10/1973 Ota (Continued)

FOREIGN PATENT DOCUMENTS

EP 1 099 207 B1 3/2002

(Continued)

OTHER PUBLICATIONS

Amundson, K., "Electrophoretic Imaging Films for Electronic Paper Displays" in Crawford, G. ed. Flexible Flat Panel Displays, John Wiley & Sons, Ltd., Hoboken, NJ: 2005.

(Continued)

*Primary Examiner*—Loha Ben
(74) *Attorney, Agent, or Firm*—David J. Cole

(57) ABSTRACT

A front plane laminate (see U.S. Pat. No. 6,982,178) is produced by forming a sub-assembly comprising a lamination adhesive layer and an electro-optic layer, forming an aperture through the sub-assembly, and securing a light-transmissive electrode layer to the sub-assembly so that the electrode layer extends across the aperture. Alternatively, formation of the aperture is omitted, and the electrode layer has a tab portion extending beyond the edges of the lamination adhesive and electro-optic layers. When a front plane laminate is secured to a backplane to form an electro-optic display, a stiffening layer may be attached to either part to increase its stiffness, then removed after the lamination. An electro-optic display or front plane laminate may use an adhesive layer comprising separate layers of cross-linked and non-cross-linked adhesive.

32 Claims, 10 Drawing Sheets

U.S. PATENT DOCUMENTS

| | | | |
|---|---|---|---|
| 3,792,308 A | 2/1974 | Ota | |
| 3,870,517 A | 3/1975 | Ota et al. | |
| 3,892,568 A | 7/1975 | Ota | |
| 4,418,346 A | 11/1983 | Batchelder | |
| 5,745,094 A | 4/1998 | Gordon, II et al. | |
| 5,760,761 A | 6/1998 | Sheridon | |
| 5,777,782 A | 7/1998 | Sheridon | |
| 5,808,783 A | 9/1998 | Crowley | |
| 5,872,552 A | 2/1999 | Gordon, II et al. | |
| 5,930,026 A | 7/1999 | Jacobson et al. | |
| 5,961,804 A | 10/1999 | Jacobson et al. | |
| 6,017,584 A | 1/2000 | Albert et al. | |
| 6,054,071 A | 4/2000 | Mikkelsen, Jr. | |
| 6,055,091 A | 4/2000 | Sheridon et al. | |
| 6,067,185 A | 5/2000 | Albert et al. | |
| 6,097,531 A | 8/2000 | Sheridon | |
| 6,118,426 A | 9/2000 | Albert et al. | |
| 6,120,588 A | 9/2000 | Jacobson | |
| 6,120,839 A | 9/2000 | Comiskey et al. | |
| 6,124,851 A | 9/2000 | Jacobson | |
| 6,128,124 A | 10/2000 | Silverman | |
| 6,130,773 A | 10/2000 | Jacobson et al. | |
| 6,130,774 A | 10/2000 | Albert et al. | |
| 6,137,467 A | 10/2000 | Sheridon et al. | |
| 6,144,361 A | 11/2000 | Gordon, II et al. | |
| 6,147,791 A | 11/2000 | Sheridon | |
| 6,172,798 B1 | 1/2001 | Albert et al. | |
| 6,177,921 B1 | 1/2001 | Comiskey et al. | |
| 6,184,856 B1 | 2/2001 | Gordon, II et al. | |
| 6,225,971 B1 | 5/2001 | Gordon, II et al. | |
| 6,232,950 B1 | 5/2001 | Albert et al. | |
| 6,241,921 B1 | 6/2001 | Jacobson et al. | |
| 6,249,271 B1 | 6/2001 | Albert et al. | |
| 6,252,564 B1 | 6/2001 | Albert et al. | |
| 6,262,706 B1 | 7/2001 | Albert et al. | |
| 6,262,833 B1 | 7/2001 | Loxley et al. | |
| 6,271,823 B1 | 8/2001 | Gordon, II et al. | |
| 6,300,932 B1 | 10/2001 | Albert | |
| 6,301,038 B1 | 10/2001 | Fitzmaurice et al. | |
| 6,312,304 B1 | 11/2001 | Duthaler et al. | |
| 6,312,971 B1 | 11/2001 | Amundson et al. | |
| 6,323,989 B1 | 11/2001 | Jacobson et al. | |
| 6,327,072 B1 | 12/2001 | Comiskey et al. | |
| 6,376,828 B1 | 4/2002 | Comiskey | |
| 6,377,387 B1 | 4/2002 | Duthaler et al. | |
| 6,392,785 B1 | 5/2002 | Albert et al. | |
| 6,392,786 B1 | 5/2002 | Albert | |
| 6,413,790 B1 | 7/2002 | Duthaler et al. | |
| 6,422,687 B1 | 7/2002 | Jacobson | |
| 6,445,374 B2 | 9/2002 | Albert et al. | |
| 6,445,489 B1 | 9/2002 | Jacobson et al. | |
| 6,459,418 B1 | 10/2002 | Comiskey et al. | |
| 6,473,072 B1 | 10/2002 | Comiskey et al. | |
| 6,480,182 B2 | 11/2002 | Turner et al. | |
| 6,498,114 B1 | 12/2002 | Amundson et al. | |
| 6,504,524 B1 | 1/2003 | Gates et al. | |
| 6,506,438 B2 | 1/2003 | Duthaler et al. | |
| 6,512,354 B2 | 1/2003 | Jacobson et al. | |
| 6,515,649 B1 | 2/2003 | Albert et al. | |
| 6,518,949 B2 | 2/2003 | Drzaic | |
| 6,521,489 B2 | 2/2003 | Duthaler et al. | |
| 6,531,997 B1 | 3/2003 | Gates et al. | |
| 6,535,197 B1 | 3/2003 | Comiskey et al. | |
| 6,538,801 B2 | 3/2003 | Jacobson et al. | |
| 6,545,291 B1 | 4/2003 | Amundson et al. | |
| 6,580,545 B2 | 6/2003 | Morrison et al. | |
| 6,636,186 B1 | 10/2003 | Yamaguchi et al. | |
| 6,639,578 B1 | 10/2003 | Comiskey et al. | |
| 6,652,075 B2 | 11/2003 | Jacobson | |
| 6,657,772 B2 | 12/2003 | Loxley | |
| 6,664,944 B1 | 12/2003 | Albert et al. | |
| D485,294 S | 1/2004 | Albert | |
| 6,672,921 B1 | 1/2004 | Liang et al. | |
| 6,680,725 B1 | 1/2004 | Jacobson | |
| 6,683,333 B2 | 1/2004 | Kazlas et al. | |
| 6,693,620 B1 | 2/2004 | Herb et al. | |
| 6,704,133 B2 | 3/2004 | Gates et al. | |
| 6,710,540 B1 | 3/2004 | Albert et al. | |
| 6,721,083 B2 | 4/2004 | Jacobson et al. | |
| 6,724,519 B1 | 4/2004 | Comiskey et al. | |
| 6,727,881 B1 | 4/2004 | Albert et al. | |
| 6,738,050 B2 | 5/2004 | Comiskey et al. | |
| 6,750,473 B2 | 6/2004 | Amundson et al. | |
| 6,753,999 B2 | 6/2004 | Zehner et al. | |
| 6,788,449 B2 | 9/2004 | Liang et al. | |
| 6,816,147 B2 | 11/2004 | Albert | |
| 6,819,471 B2 | 11/2004 | Amundson et al. | |
| 6,822,782 B2 | 11/2004 | Honeyman et al. | |
| 6,825,068 B2 | 11/2004 | Denis et al. | |
| 6,825,829 B1 | 11/2004 | Albert et al. | |
| 6,825,970 B2 | 11/2004 | Goenaga et al. | |
| 6,831,769 B2 | 12/2004 | Holman et al. | |
| 6,839,158 B2 | 1/2005 | Albert et al. | |
| 6,842,167 B2 | 1/2005 | Albert et al. | |
| 6,842,279 B2 | 1/2005 | Amundson | |
| 6,842,657 B1 | 1/2005 | Drzaic et al. | |
| 6,844,673 B1 * | 1/2005 | Bernkopf | 313/506 |
| 6,864,875 B2 | 3/2005 | Drzaic et al. | |
| 6,865,010 B2 | 3/2005 | Duthaler et al. | |
| 6,866,760 B2 | 3/2005 | Paolini, Jr. et al. | |
| 6,870,657 B1 | 3/2005 | Fitzmaurice et al. | |
| 6,870,661 B2 | 3/2005 | Pullen et al. | |
| 6,900,851 B2 | 5/2005 | Morrison et al. | |
| 6,922,276 B2 | 7/2005 | Zhang et al. | |
| 6,950,220 B2 | 9/2005 | Abramson et al. | |
| 6,958,848 B2 | 10/2005 | Cao et al. | |
| 6,967,640 B2 | 11/2005 | Albert et al. | |
| 6,980,196 B1 | 12/2005 | Turner et al. | |
| 6,982,178 B2 * | 1/2006 | LeCain et al. | 438/22 |
| 6,987,603 B2 | 1/2006 | Paolini, Jr. et al. | |
| 6,995,550 B2 | 2/2006 | Jacobson et al. | |
| 7,002,728 B2 | 2/2006 | Pullen et al. | |
| 7,012,600 B2 | 3/2006 | Zehner et al. | |
| 7,012,735 B2 | 3/2006 | Honeyman et al. | |
| 7,023,420 B2 | 4/2006 | Comiskey et al. | |
| 7,030,412 B1 | 4/2006 | Drzaic et al. | |
| 7,030,854 B2 | 4/2006 | Baucom et al. | |
| 7,034,783 B2 | 4/2006 | Gates et al. | |
| 7,038,655 B2 | 5/2006 | Herb et al. | |
| 7,061,663 B2 | 6/2006 | Cao et al. | |
| 7,071,913 B2 | 7/2006 | Albert et al. | |
| 7,075,502 B1 | 7/2006 | Drzaic et al. | |
| 7,075,703 B2 | 7/2006 | O'Neil et al. | |
| 7,079,305 B2 | 7/2006 | Paolini, Jr. et al. | |
| 7,106,296 B1 | 9/2006 | Jacobson | |
| 7,109,968 B2 | 9/2006 | Albert et al. | |
| 7,110,163 B2 | 9/2006 | Webber et al. | |
| 7,110,164 B2 * | 9/2006 | Paolini et al. | 359/296 |
| 7,116,318 B2 | 10/2006 | Amundson et al. | |
| 7,116,466 B2 | 10/2006 | Whitesides et al. | |
| 7,119,759 B2 | 10/2006 | Zehner et al. | |
| 7,119,772 B2 | 10/2006 | Amundson et al. | |
| 7,148,128 B2 | 12/2006 | Jacobson | |
| 7,167,155 B1 | 1/2007 | Albert et al. | |
| 7,170,670 B2 | 1/2007 | Webber | |
| 7,173,752 B2 | 2/2007 | Doshi et al. | |
| 7,176,880 B2 | 2/2007 | Amundson et al. | |
| 7,180,649 B2 | 2/2007 | Morrison et al. | |
| 7,190,008 B2 | 3/2007 | Amundson et al. | |
| 7,193,625 B2 | 3/2007 | Danner et al. | |
| 7,202,847 B2 | 4/2007 | Gates | |
| 7,202,991 B2 | 4/2007 | Zhang et al. | |
| 7,206,119 B2 | 4/2007 | Honeyman et al. | |
| 7,223,672 B2 | 5/2007 | Kazlas et al. | |

| | | |
|---|---|---|
| 7,230,750 B2 | 6/2007 | Whitesides et al. |
| 7,230,751 B2 | 6/2007 | Whitesides et al. |
| 7,236,290 B1 | 6/2007 | Zhang et al. |
| 7,236,291 B2 | 6/2007 | Kaga et al. |
| 7,236,292 B2 | 6/2007 | LeCain et al. |
| 7,242,513 B2 | 7/2007 | Albert et al. |
| 7,247,379 B2 | 7/2007 | Pullen et al. |
| 7,256,766 B2 | 8/2007 | Albert et al. |
| 7,259,744 B2 | 8/2007 | Arango et al. |
| 7,280,094 B2 | 10/2007 | Albert |
| 7,304,634 B2 | 12/2007 | Albert et al. |
| 7,304,787 B2 | 12/2007 | Whitesides et al. |
| 7,312,784 B2 | 12/2007 | Baucom et al. |
| 7,312,794 B2 | 12/2007 | Zehner et al. |
| 7,312,916 B2 | 12/2007 | Pullen et al. |
| 7,321,459 B2 | 1/2008 | Masuda et al. |
| 7,327,511 B2 | 2/2008 | Whitesides et al. |
| 7,339,715 B2 | 3/2008 | Webber et al. |
| 7,349,148 B2 | 3/2008 | Doshi et al. |
| 7,352,353 B2 | 4/2008 | Albert et al. |
| 7,365,394 B2 | 4/2008 | Denis et al. |
| 7,365,733 B2 | 4/2008 | Duthaler et al. |
| 7,382,363 B2 | 6/2008 | Albert et al. |
| 7,388,572 B2 | 6/2008 | Duthaler et al. |
| 7,391,555 B2 | 6/2008 | Albert et al. |
| 7,411,719 B2 | 8/2008 | Paolini, Jr. et al. |
| 7,411,720 B2 | 8/2008 | Honeyman et al. |
| 7,420,549 B2 | 9/2008 | Jacobson et al. |
| 7,442,587 B2 | 10/2008 | Amundson et al. |
| 7,453,445 B2 | 11/2008 | Amundson |
| 7,492,339 B2 | 2/2009 | Amundson |
| 7,513,813 B2 | 4/2009 | Paolini, Jr. et al. |
| 7,528,822 B2 | 5/2009 | Amundson et al. |
| 7,535,624 B2 | 5/2009 | Amundson et al. |
| 7,545,358 B2 | 6/2009 | Gates et al. |
| 7,551,346 B2 * | 6/2009 | Fazel et al. .............. 359/321 |
| 7,554,712 B2 | 6/2009 | Patry et al. |
| 7,561,324 B2 | 7/2009 | Duthaler et al. |
| 7,598,173 B2 | 10/2009 | Ritenour et al. |
| 7,602,374 B2 | 10/2009 | Zehner et al. |
| 2001/0045934 A1 | 11/2001 | Turner et al. |
| 2002/0060321 A1 | 5/2002 | Kazlas et al. |
| 2002/0090980 A1 | 7/2002 | Wilcox et al. |
| 2003/0102858 A1 | 6/2003 | Jacobson et al. |
| 2004/0027327 A1 * | 2/2004 | LeCain et al. ............ 345/107 |
| 2004/0105036 A1 | 6/2004 | Danner et al. |
| 2004/0112750 A1 | 6/2004 | Jacobson et al. |
| 2004/0119681 A1 | 6/2004 | Albert et al. |
| 2004/0155857 A1 | 8/2004 | Duthaler et al. |
| 2004/0180476 A1 | 9/2004 | Kazlas et al. |
| 2004/0190114 A1 | 9/2004 | Jacobson et al. |
| 2004/0263947 A1 | 12/2004 | Drzaic et al. |
| 2005/0001810 A1 | 1/2005 | Yakushiji et al. |
| 2005/0007336 A1 | 1/2005 | Albert et al. |
| 2005/0012980 A1 | 1/2005 | Wilcox et al. |
| 2005/0018273 A1 | 1/2005 | Honeyman et al. |
| 2005/0024353 A1 | 2/2005 | Amundson et al. |
| 2005/0062714 A1 | 3/2005 | Zehner et al. |
| 2005/0122284 A1 | 6/2005 | Gates et al. |
| 2005/0122306 A1 | 6/2005 | Wilcox et al. |
| 2005/0122563 A1 | 6/2005 | Honeyman et al. |
| 2005/0152018 A1 | 7/2005 | Abramson et al. |
| 2005/0156340 A1 | 7/2005 | Valianatos et al. |
| 2005/0179642 A1 | 8/2005 | Wilcox et al. |
| 2005/0212747 A1 | 9/2005 | Amundson |
| 2005/0253777 A1 | 11/2005 | Zehner et al. |
| 2005/0259068 A1 | 11/2005 | Nihei et al. |
| 2005/0270261 A1 | 12/2005 | Danner et al. |
| 2005/0280626 A1 | 12/2005 | Amundson et al. |
| 2006/0038772 A1 | 2/2006 | Amundson et al. |
| 2006/0087479 A1 | 4/2006 | Sakurai et al. |
| 2006/0087489 A1 | 4/2006 | Sakurai et al. |
| 2006/0087718 A1 | 4/2006 | Takagi et al. |
| 2006/0139308 A1 | 6/2006 | Jacobson et al. |
| 2006/0139310 A1 | 6/2006 | Zehner et al. |
| 2006/0139311 A1 | 6/2006 | Zehner et al. |
| 2006/0176267 A1 | 8/2006 | Honeyman et al. |
| 2006/0181492 A1 | 8/2006 | Gates et al. |
| 2006/0181504 A1 | 8/2006 | Kawai |
| 2006/0194619 A1 | 8/2006 | Wilcox et al. |
| 2006/0197737 A1 | 9/2006 | Baucom et al. |
| 2006/0197738 A1 | 9/2006 | Kawai |
| 2006/0202949 A1 | 9/2006 | Danner et al. |
| 2006/0209008 A1 | 9/2006 | Nihei et al. |
| 2006/0214906 A1 | 9/2006 | Kobayashi et al. |
| 2006/0231401 A1 | 10/2006 | Sakurai et al. |
| 2006/0232531 A1 | 10/2006 | Amundson et al. |
| 2006/0238488 A1 | 10/2006 | Nihei et al. |
| 2006/0263927 A1 | 11/2006 | Sakurai et al. |
| 2006/0279527 A1 | 12/2006 | Zehner et al. |
| 2006/0291034 A1 | 12/2006 | Patry et al. |
| 2007/0013683 A1 | 1/2007 | Zhou et al. |
| 2007/0035532 A1 | 2/2007 | Amundson et al. |
| 2007/0035808 A1 | 2/2007 | Amundson et al. |
| 2007/0052757 A1 | 3/2007 | Jacobson |
| 2007/0057908 A1 | 3/2007 | Jacobson |
| 2007/0069247 A1 | 3/2007 | Amundson et al. |
| 2007/0085818 A1 | 4/2007 | Amundson et al. |
| 2007/0091417 A1 | 4/2007 | Cao et al. |
| 2007/0091418 A1 | 4/2007 | Danner et al. |
| 2007/0103427 A1 | 5/2007 | Zhou et al. |
| 2007/0109219 A1 * | 5/2007 | Whitesides et al. .......... 345/55 |
| 2007/0146310 A1 | 6/2007 | Paolini, Jr. et al. |
| 2007/0152956 A1 * | 7/2007 | Danner et al. .............. 345/107 |
| 2007/0153361 A1 | 7/2007 | Danner et al. |
| 2007/0211002 A1 | 9/2007 | Zehner et al. |
| 2008/0074730 A1 | 3/2008 | Cao et al. |
| 2008/0299859 A1 | 12/2008 | Paolini, Jr. et al. |
| 2008/0316582 A1 * | 12/2008 | Danner et al. .............. 359/296 |

FOREIGN PATENT DOCUMENTS

| | | |
|---|---|---|
| EP | 1 145 072 B1 | 5/2003 |
| WO | WO 00/36560 | 6/2000 |
| WO | WO 00/38000 | 6/2000 |
| WO | WO 00/67110 | 11/2000 |
| WO | WO 01/07961 | 2/2001 |
| WO | WO 2004/079442 | 9/2004 |

OTHER PUBLICATIONS

Amundson, K., et al., "Flexible, Active-Matrix Display Constructed Using a Microencapsulated Electrophoretic Material and an Organic-Semiconductor-Based Backplane", SID 01 Digest, 160 (Jun. 2001).

Au, J. et al., "Ultra-Thin 3.1-in. Active-Matrix Electronic Ink Display for Mobile Devices", IDW'02, 223 (2002).

Bach, U., et al., "Nanomaterials-Based Electrochromics for Paper-Quality Displays", Adv. Mater, 14(11), 845 (2002).

Bouchard, A. et al., "High-Resolution Microencapsulated Electrophoretic Display on Silicon", SID 04 Digest, 651 (2004).

Caillot, E. et al. "Active Matrix Electrophoretic Information Display for High Performance Mobile Devices", IDMC Proceedings (2003).

Chen, Y., et al., "A Conformable Electronic Ink Display using a Foil-Based a-Si TFT Array", SID 01 Digest, 157 (Jun. 2001).

Comiskey, B., et al., "An electrophoretic ink for all-printed reflective electronic displays", Nature, 394, 253 (1998).

Comiskey, B., et al., "Electrophoretic Ink: A Printable Display Material", SID 97 Digest (1997), p. 75.

Danner, G.M. et al., "Reliability Performance for Microencapsulated Electrophoretic Displays with Simulated Active Matrix Drive", SID 03 Digest, 573 (2003).

Drzaic, P., et al., "A Printed and Rollable Bistable Electronic Display", SID 98 Digest (1998), p. 1131.

Duthaler, G., et al., "Active-Matrix Color Displays Using Electrophoretic Ink and Color Filters", SID 02 Digest, 1374 (2002).

Gates, H. et al., "A5 Sized Electronic Paper Display for Document Viewing", SID 05 Digest, (2005).

Hayes, R.A., et al., "Video-Speed Electronic Paper Based on Electrowetting", Nature, vol. 425, Sep. 25, pp. 383-385 (2003).

Henzen, A. et al., "An Electronic Ink Low Latency Drawing Tablet", SID 04 Digest, 1070 (2004).

Henzen, A. et al., "Development of Active Matrix Electronic Ink Displays for Handheld Devices", SID 03 Digest, 176, (2003).

Henzen, A. et al., "Development of Active Matrix Electronic Ink Displays for Smart Handheld Applications", IDW'02, 227 (2002).

Jacobson, J., et al., "The last book", IBM Systems J., 36, 457 (1997).

Jo, G-R, et al., "Toner Display Based on Particle Movements", Chem. Mater, 14, 664 (2002).

Johnson, M. et al., "High Quality Images on Electronic Paper Displays", SID 05 Digest, 1666 (2005).

Kazlas, P. et al., "Card-size Active-matrix Electronic Ink Display", Eurodisplay 2002, 259 (2002).

Kazlas, P., "12.1" SVGA Microencapsulated Electrophoretic Active Matrix Display for Information Applicances", SID 01 Digest, 152 (Jun. 2001).

Kitamura, T., et al., "Electrical toner movement for electronic paper-like display", Asia Display/IDW '01, p. 1517, Paper HCS1-1 (2001).

O'Regan, B. et al., "A Low Cost, High-efficiency Solar Cell Based on Dye-sensitized colloidal $TiO_2$ Films", Nature, vol. 353, Oct. 24, 1991, 773-740.

Pitt, M.G., et al., "Power Consumption of Microencapsulated Electrophoretic Displays for Smart Handheld Applications", SID 02 Digest, 1378 (2002).

Webber, R., "Image Stability in Active-Matrix Microencapsulated Electrophoretic Displays", SID 02 Digest, 126 (2002).

Whitesides, T. et al., "Towards Video-rate Microencapsulated Dual-Particle Electrophoretic Displays", SID 04 Digest, 133 (2004).

Wood, D., "An Electrochromic Renaissance?" Information Display, 18(3), 24 (Mar. 2002).

Yamaguchi, Y., et al., "Toner display using insulative particles charged triboelectrically", Asia Display/IDW '01, p. 1729, Paper AMD4-4 (2001).

Zehner, R. et al., "Drive Waveforms for Active Matrix Electrophoretic Displays", SID 03 Digest, 842 (2003).

* cited by examiner

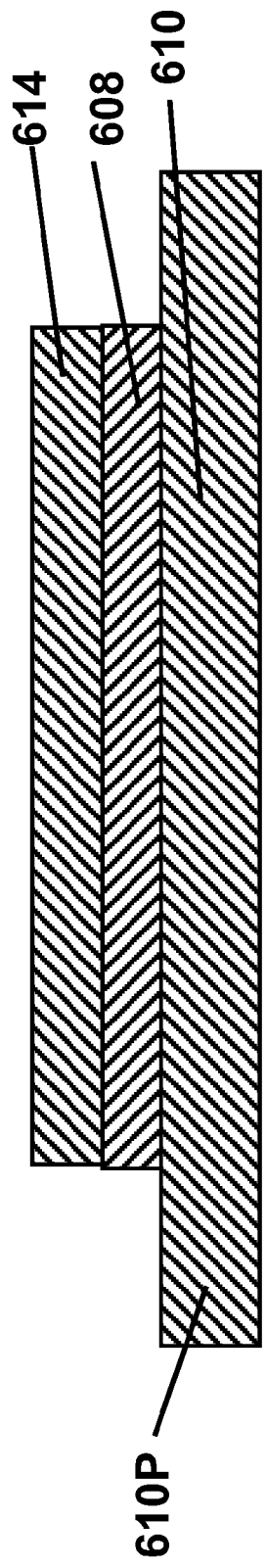
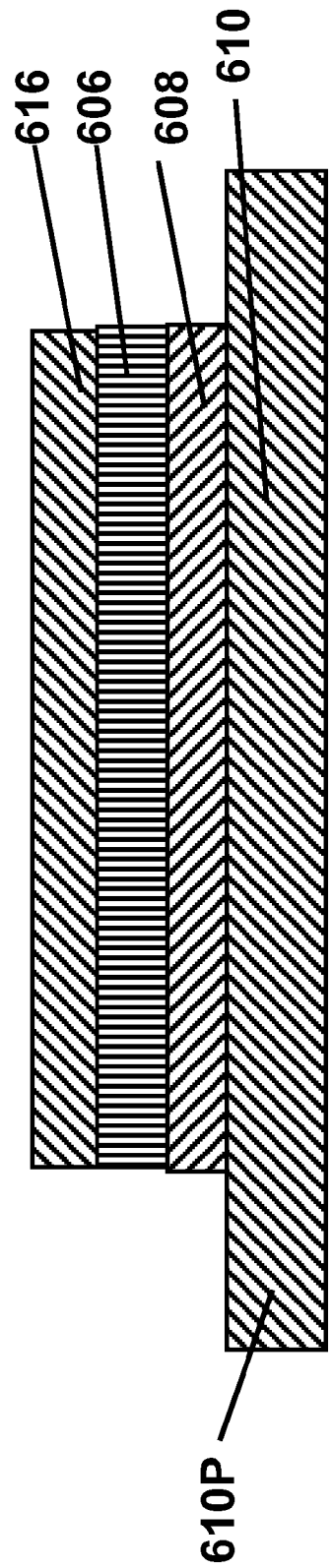
Fig. 6A
Fig. 6B

ELECTRO-OPTIC DISPLAYS, AND MATERIALS AND METHODS FOR PRODUCTION THEREOF

REFERENCE TO RELATED APPLICATIONS

This application claims benefit of copending Application Ser. No. 60/767,171, filed Mar. 8, 2006.

This invention is also related to:

(a) U.S. Pat. No. 6,982,178;

(b) copending application Ser. No. 10/605,024, filed Sep. 2, 2003 (Publication No. 2004/0155857, now U.S. Pat. No. 7,561,324), which claims benefit of Application Ser. No. 60/319,516, filed Sep. 3, 2002;

(c) U.S. Pat. No. 7,110,164, issued Sep. 19, 2006 on application Ser. No. 10/904,063, filed Oct. 21, 2004, which is a continuation-in-part of the aforementioned application Ser. No. 10/605,024, and claims benefit of Application Ser. Nos. 60/481,553, 60/481,554 and 60/481,557, all filed Oct. 24, 2003, Application Ser. No. 60/481,564, filed Oct. 27, 2003, and Application Ser. No. 60/520,226, filed Nov. 14, 2003;

(d) U.S. Pat. No. 7,075,703 issued Jul. 11, 2006 on application Ser. No. 10/905,582, filed Jan. 12, 2005, which claims benefit of Application Ser. No. 60/481,903, filed Jan. 14, 2004;

(e) copending application Ser. No. 11/550,114 filed Oct. 17, 2006 (Publication No. 2007/0109219) and claiming benefit of Application Ser. No. 60/596,743, filed Oct. 18, 2005; and (f) copending application Ser. No. 11/612,732, filed Dec. 19, 2006 (Publication No. 2007/0152956) and claiming benefit of Application Ser. No. 60/597,801, filed Dec. 20, 2005.

The entire contents of these copending applications, and of all other U.S. patents and published and copending applications mentioned below, are herein incorporated by reference.

BACKGROUND OF INVENTION

This invention relates to electro-optic displays, and to materials and methods for the production of such displays. This invention is particularly, but not exclusively, intended for use with displays comprising encapsulated electrophoretic media. However, the invention can also make use of various other types of electro-optic media which are solid, in the sense that they have solid external surfaces, although the media may, and often do, have internal cavities which contain a fluid (either liquid or gas). Thus, the term "solid electro-optic displays" includes encapsulated electrophoretic displays, encapsulated liquid crystal displays, and other types of displays discussed below.

Electro-optic displays comprise a layer of electro-optic material, a term which is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence or, in the case of displays intended for machine reading, pseudo-color in the sense of a change in reflectance of electromagnetic wavelengths outside the visible range.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

Several types of electro-optic displays are known. One type of electro-optic display is a rotating bichromal member type as described, for example, in U.S. Pat. Nos. 5,808,783; 5,777,782; 5,760,761; 6,054,071 6,055,091; 6,097,531; 6,128,124; 6,137,467; and 6,147,791 (although this type of display is often referred to as a "rotating bichromal ball" display, the term "rotating bichromal member" is preferred as more accurate since in some of the patents mentioned above the rotating members are not spherical). Such a display uses a large number of small bodies (typically spherical or cylindrical) which have two or more sections with differing optical characteristics, and an internal dipole. These bodies are suspended within liquid-filled vacuoles within a matrix, the vacuoles being filled with liquid so that the bodies are free to rotate. The appearance of the display is changed by applying an electric field thereto, thus rotating the bodies to various positions and varying which of the sections of the bodies is seen through a viewing surface. This type of electro-optic medium is typically bistable.

Another type of electro-optic display uses an electrochromic medium, for example an electrochromic medium in the form of a nanochromic film comprising an electrode formed at least in part from a semi-conducting metal oxide and a plurality of dye molecules capable of reversible color change attached to the electrode; see, for example O'Regan, B., et al., Nature 1991, 353, 737; and Wood, D., Information Display, 18 (3), 24 (March 2002). See also Bach, U., et al., Adv. Mater., 2002, 14 (11), 845. Nanochromic films of this type are also described, for example, in U.S. Pat. Nos. 6,301,038; 6,870.657; and 6,950,220. This type of medium is also typically bistable.

Another type of electro-optic display is an electro-wetting display developed by Philips and described in Hayes, R. A., et al., "Video-Speed Electronic Paper Based on Electrowetting", Nature, 425, 383-385 (2003). It is shown in copending application Ser. No. 10/711,802, filed Oct. 6, 2004 (Publication No. 2005/0151709), that such electro-wetting displays can be made bistable.

Another type of electro-optic display, which has been the subject of intense research and development for a number of years, is the particle-based electrophoretic display, in which a plurality of charged particles move through a fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

As noted above, electrophoretic media require the presence of a fluid. In most prior art electrophoretic media, this fluid is a liquid, but electrophoretic media can be produced using gaseous fluids; see, for example, Kitamura, T., et al., "Electrical toner movement for electronic paper-like display", IDW Japan, 2001, Paper HCS1-1, and Yamaguchi, Y., et al., "Toner display using insulative particles charged triboelectrically", IDW Japan, 2001, Paper AMD4-4). See also U.S. Patent Publication No. 2005/0001810; European Patent Applications 1,462,847; 1,482,354; 1,484,635; 1,500,971; 1,501,194; 1,536,271; 1,542,067; 1,577,702; 1,577,703; and 1,598,694; and International Applications WO 2004/090626; WO 2004/079442; and WO 2004/001498. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT) and E Ink Corporation have recently been published describing encapsulated electrophoretic media. Such encapsulated media comprise numerous small capsules, each of which itself comprises an internal phase containing electrophoretically-mobile particles suspended in a liquid suspending medium, and a capsule wall surrounding the internal phase. Typically, the capsules are themselves held within a polymeric binder to form a coherent layer positioned between two electrodes. Encapsulated media of this type are described, for example, in U.S. Pat. Nos. 5,930,026; 5,961,804; 6,017,584; 6,067,185; 6,118,426; 6,120,588; 6,120,839; 6,124,851; 6,130,773; 6,130,774; 6,172,798; 6,177,921; 6,232,950; 6,249,271; 6,252,564; 6,262,706; 6,262,833; 6,300,932; 6,312,304; 6,312,971; 6,323,989; 6,327,072; 6,376,828; 6,377,387; 6,392,785; 6,392,786; 6,413,790; 6,422,687; 6,445,374; 6,445,489; 6,459,418; 6,473,072; 6,480,182; 6,498,114; 6,504,524; 6,506,438; 6,512,354; 6,515,649; 6,518,949; 6,521,489; 6,531,997; 6,535,197; 6,538,801; 6,545,291; 6,580,545; 6,639,578; 6,652,075; 6,657,772; 6,664,944; 6,680,725; 6,683,333; 6,704,133; 6,710,540; 6,721,083; 6,724,519; 6,727,881; 6,738,050; 6,750,473; 6,753,999; 6,816,147; 6,819,471; 6,822,782; 6,825,068; 6,825,829; 6,825,970; 6,831,769; 6,839,158; 6,842,167; 6,842,279; 6,842,657; 6,864,875; 6,865,010; 6,866,760; 6,870,661; 6,900,851; 6,922,276; 6,950,200; 6,958,848; 6,967,640; 6,982,178; 6,987,603; 6,995,550; 7,002,728; 7,012,600; 7,012,735; 7,023,420; 7,030,412; 7,030,854; 7,034,783; 7,038,655; 7,061,663; 7,071,913; 7,075,502; 7,075,703; 7,079,305; 7,106,296; 7,109,968; 7,110,163; 7,110,164; 7,116,318; 7,116,466; 7,119,759; 7,119,772; 7,148,128; 7,167,155; 7,170,670; and 7,173,752; and U.S. Patent Applications Publication Nos. 2002/0060321; 2002/0090980; 2003/0011560; 2003/0102858; 2003/0151702; 2003/0222315; 2004/0014265; 2004/0075634; 2004/0094422; 2004/0105036; 2004/0112750; 2004/0119681; 2004/0136048; 2004/0155857; 2004/0180476; 2004/0190114; 2004/0196215; 2004/0226820; 2004/0239614; 2004/0257635; 2004/0263947; 2005/0000813; 2005/0007336; 2005/0012980; 2005/0017944; 2005/0018273; 2005/0024353; 2005/0062714; 2005/0067656; 2005/0078099; 2005/0099672; 2005/0122284; 2005/0122306; 2005/0122563; 2005/0134554; 2005/0146774; 2005/0151709; 2005/0152018; 2005/0152022; 2005/0156340; 2005/0168799; 2005/0179642; 2005/0190137; 2005/0212747; 2005/0213191; 2005/0219184; 2005/0253777; 2005/0270261; 2005/0280626; 2006/0007527; 2006/0024437; 2006/0038772; 2006/0139308; 2006/0139310; 2006/0139311; 2006/0176267; 2006/0181492; 2006/0181504; 2006/0194619; 2006/0197736; 2006/0197737; 2006/0197738; 2006/0198014; 2006/0202949; and 2006/0209388; and International Applications Publication Nos. WO 00/38000; WO 00/36560; WO 00/67110; and WO 01/07961; and European Patents Nos. 1,099,207 B1; and 1,145,072 B1.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned U.S. Pat. No. 6,866,760. Accordingly, for purposes of the present application, such polymer-dispersed electrophoretic media are regarded as sub-species of encapsulated electrophoretic media.

A related type of electrophoretic display is a so-called "microcell electrophoretic display". In a microcell electrophoretic display, the charged particles and the fluid are not encapsulated within microcapsules but instead are retained within a plurality of cavities formed within a carrier medium, typically a polymeric film. See, for example, U.S. Pat. Nos. 6,672,921 and 6,788,449, both assigned to Sipix Imaging, Inc.

Although electrophoretic media are often opaque (since, for example, in many electrophoretic media, the particles substantially block transmission of visible light through the display) and operate in a reflective mode, many electrophoretic displays can be made to operate in a so-called "shutter mode" in which one display state is substantially opaque and one is light-transmissive. See, for example, the aforementioned U.S. Pat. Nos. 6,130,774 and 6,172,798, and U.S. Pat. Nos. 5,872,552; 6,144,361; 6,271,823; 6,225,971; and 6,184,856. Dielectrophoretic displays, which are similar to electrophoretic displays but rely upon variations in electric field strength, can operate in a similar mode; see U.S. Pat. No. 4,418,346.

An encapsulated or microcell electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition; and other similar techniques.) Thus, the resulting display can be flexible. Further, because the display medium can be printed (using a variety of methods), the display itself can be made inexpensively.

Other types of electro-optic materials may also be used in the present invention.

An electro-optic display normally comprises a layer of electro-optic material and at least two other layers disposed on opposed sides of the electro-optic material, one of these two layers being an electrode layer. In most such displays both the layers are electrode layers, and one or both of the electrode layers are patterned to define the pixels of the display. For example, one electrode layer may be patterned into elongate row electrodes and the other into elongate column electrodes running at right angles to the row electrodes, the pixels being defined by the intersections of the row and column electrodes. Alternatively, and more commonly, one electrode layer has the form of a single continuous electrode and the other electrode layer is patterned into a matrix of pixel electrodes, each of which defines one pixel of the display. In another type of electro-optic display, which is intended for use with a stylus, print head or similar movable electrode separate from the display, only one of the layers adjacent the electro-optic layer comprises an electrode, the layer on the opposed side of the electro-optic layer typically being a protective layer intended to prevent the movable electrode damaging the electro-optic layer.

The manufacture of a three-layer electro-optic display normally involves at least one lamination operation. For example, in several of the aforementioned MIT and E Ink patents and applications, there is described a process for manufacturing an encapsulated electrophoretic display in which an encapsulated electrophoretic medium comprising capsules in a binder is coated on to a flexible substrate comprising indium tin oxide (ITO) or a similar conductive coating (which acts as an one electrode of the final display) on a plastic film, the capsules/binder coating being dried to form a coherent layer of the electrophoretic medium firmly adhered to the substrate. Separately, a backplane, containing an array of pixel electrodes and an appropriate arrangement of conductors to connect the pixel electrodes to drive circuitry, is prepared. To form the final display, the substrate having the capsule/binder layer thereon is laminated to the backplane using a lamination adhesive. (A very similar process can be used to prepare an electrophoretic display usable with a stylus or similar movable electrode by replacing the backplane with a simple protective layer, such as a plastic film, over which the stylus or other movable electrode can slide). In one preferred form of such a process, the backplane is itself flexible and is prepared by printing the pixel electrodes and conductors on a plastic film or other flexible substrate. The obvious lamination technique for mass production of displays by this process is roll lamination using a lamination adhesive. Similar manufacturing techniques can be used with other types of electro-optic displays. For example, a microcell electrophoretic medium or a rotating bichromal member medium may be laminated to a backplane in substantially the same manner as an encapsulated electrophoretic medium.

In the processes described above, the lamination of the substrate carrying the electro-optic layer to the backplane may advantageously be carried out by vacuum lamination. Vacuum lamination is effective in expelling air from between the two materials being laminated, thus avoiding unwanted air bubbles in the final display; such air bubbles may introduce undesirable artifacts in the images produced on the display. However, vacuum lamination of the two parts of an electro-optic display in this manner imposes stringent requirements upon the lamination adhesive used, as described in the aforementioned U.S. Pat. Nos. 6,657,772 and 6,831,769, especially in the case of a display using an encapsulated electrophoretic medium. The lamination adhesive must have sufficient adhesive strength to bind the electro-optic layer to the layer (typically an electrode layer) to which it is to be laminated, and in the case of an encapsulated electrophoretic medium, the adhesive must also have sufficient adhesive strength to mechanically hold the capsules together. If the electro-optic display is to be of a flexible type (and one of the important advantages of rotating bichromal member and encapsulated electrophoretic displays is that they can be made flexible), the adhesive must have sufficient flexibility not to introduce defects into the display when the display is flexed. The lamination adhesive must have adequate flow properties at the lamination temperature to ensure high quality lamination, and in this regard, the demands of laminating encapsulated electrophoretic and some other types of electro-optic media are unusually difficult; the lamination has be conducted at a temperature of not more than about 130° C. since the medium cannot be exposed to substantially higher temperatures without damage, but the flow of the adhesive must cope with the relatively uneven surface of the capsule-containing layer, the surface of which is rendered irregular by the underlying capsules. The lamination adhesive must be chemically compatible with all the other materials in the display.

In considering the choice of a lamination adhesive for use in an electro-optic display, attention must be paid to the process by which the display is to be assembled. Most prior art methods for final lamination of electrophoretic displays are essentially batch methods in which the electro-optic medium, the lamination adhesive and the backplane are only brought together immediately prior to final assembly, and it is desirable to provide methods better adapted for mass production.

As discussed in the aforementioned U.S. Pat. No. 6,982, 178, many of the components used in solid electro-optic displays, and the methods used to manufacture such displays, are derived from technology used in liquid crystal displays (LCD's), which are of course also electro-optic displays, though using a liquid rather than a solid medium. For example, solid electro-optic displays may make use of an active matrix backplane comprising an array of transistors or diodes and a corresponding array of pixel electrodes, and a "continuous" front electrode (in the sense of an electrode which extends over multiple pixels and typically the whole display) on a transparent substrate, these components being essentially the same as in LCD's. However, the methods used for assembling LCD's cannot be used with solid electro-optic displays. LCD's are normally assembled by forming the backplane and front electrode on separate glass substrates, then adhesively securing these components together leaving a small aperture between them, placing the resultant assembly under vacuum, and immersing the assembly in a bath of the liquid crystal, so that the liquid crystal flows through the aperture between the backplane and the front electrode. Finally, with the liquid crystal in place, the aperture is sealed to provide the final display.

This LCD assembly process cannot readily be transferred to solid electro-optic displays. Because the electro-optic material is solid, it must be present between the backplane and the front electrode before these two integers are secured to each other. Furthermore, in contrast to a liquid crystal material, which is simply placed between the front electrode and the backplane without being attached to either, a solid electro-optic medium normally needs to be secured to both; in most cases the solid electro-optic medium is formed on the front electrode, since this is generally easier than forming the medium on the circuitry-containing backplane, and the front electrode/electro-optic medium combination is then laminated to the backplane, typically by covering the entire surface of the electro-optic medium with an adhesive and laminating under heat, pressure and possibly vacuum.

Electro-optic displays are often costly; for example, the cost of the color LCD found in a portable computer is typically a substantial fraction of the entire cost of the computer. As the use of electro-optic displays spreads to devices, such as cellular telephones and personal digital assistants (PDA's), much less costly than portable computers, there is great pressure to reduce the costs of such displays. The ability to form layers of some solid electro-optic media by printing techniques on flexible substrates, as discussed above, opens up the possibility of reducing the cost of electro-optic components of displays by using mass production techniques such as roll-to-roll coating using commercial equipment used for the production of coated papers, polymeric films and similar media. However, such equipment is costly and the areas of electro-optic media presently sold may be insufficient to justify dedicated equipment, so that it may typically be necessary to transport the coated medium from a commercial coating plant to the plant used for final assembly of electro-optic displays without damage to the relatively fragile layer of electro-optic medium.

The aforementioned U.S. Pat. No. 6,982,178 describes a method of assembling a solid electro-optic display (including a particle-based electrophoretic display) which is well adapted for mass production. Essentially, this patent describes a so-called "front plane laminate" ("FPL") which comprises, in order, a light-transmissive electrically-conductive layer; a layer of a solid electro-optic medium in electrical contact with the electrically-conductive layer; an adhesive layer; and a release sheet. Typically, the light-transmissive electrically-conductive layer will be carried on a light-transmissive substrate, which is preferably flexible, in the sense that the substrate can be manually wrapped around a drum (say) 10 inches (254 mm) in diameter without permanent deformation. The term "light-transmissive" is used in this patent and herein to mean that the layer thus designated transmits sufficient light to enable an observer, looking through that layer, to observe the change in display states of the electro-optic medium, which will be normally be viewed through the electrically-conductive layer and adjacent substrate (if present). The substrate will be typically be a polymeric film, and will normally have a thickness in the range of about 1 to about 25 mil (25 to 634 µm), preferably about 2 to about 10 mil (51 to 254 µm). The electrically-conductive layer is conveniently a thin metal layer of, for example, aluminum or ITO, or may be a conductive polymer. Poly(ethylene terephthalate) (PET) films coated with aluminum or ITO are available commercially, for example as "aluminized Mylar" ("Mylar" is a Registered Trade Mark) from E.I. du Pont de Nemours & Company, Wilmington Del., and such commercial materials may be used with good results in the front plane laminate.

Assembly of an electro-optic display using such a front plane laminate may be effected by removing the release sheet from the front plane laminate and contacting the adhesive layer with the backplane under conditions effective to cause the adhesive layer to adhere to the backplane, thereby securing the adhesive layer, layer of electro-optic medium and electrically-conductive layer to the backplane. This process is well-adapted to mass production since the front plane laminate may be mass produced, typically using roll-to-roll coating techniques, and then cut into pieces of any size needed for use with specific backplanes.

The aforementioned U.S. Pat. No. 6,982,178 also describes a method for testing the electro-optic medium in a front plane laminate prior to incorporation of the front plane laminate into a display. In this testing method, the release sheet is provided with an electrically conductive layer, and a voltage sufficient to change the optical state of the electro-optic medium is applied between this electrically conductive layer and the electrically conductive layer on the opposed side of the electro-optic medium. Observation of the electro-optic medium will then reveal any faults in the medium, thus avoiding laminating faulty electro-optic medium into a display, with the resultant cost of scrapping the entire display, not merely the faulty front plane laminate.

The aforementioned U.S. Pat. No. 6,982,178 also describes a second method for testing the electro-optic medium in a front plane laminate by placing an electrostatic charge on the release sheet, thus forming an image on the electro-optic medium. This image is then observed in the same way as before to detect any faults in the electro-optic medium.

The aforementioned 2004/0155857 describes a so-called "double release film" which is essentially a simplified version of the front plane laminate of the aforementioned U.S. Pat. No. 6,982,178. One form of the double release sheet comprises a layer of a solid electro-optic medium sandwiched between two adhesive layers, one or both of the adhesive layers being covered by a release sheet. Another form of the double release sheet comprises a layer of a solid electro-optic medium sandwiched between two release sheets. Both forms of the double release film are intended for use in a process generally similar to the process for assembling an electro-optic display from a front plane laminate already described, but involving two separate laminations; typically, in a first lamination the double release sheet is laminated to a front electrode to form a front sub-assembly, and then in a second lamination the front sub-assembly is laminated to a backplane to form the final display, although the order of these two laminations could be reversed if desired.

The aforementioned copending application Ser. No. 11/550,114 describes a so-called "inverted front plane laminate", which is a variant of the front plane laminate described in the aforementioned U.S. Pat. No. 6,982,178. This inverted front plane laminate comprises, in order, at least one of a light-transmissive protective layer and a light-transmissive electrically-conductive layer; an adhesive layer; a layer of a solid electro-optic medium; and a release sheet. This inverted front plane laminate is used to form an electro-optic display having a layer of lamination adhesive between the electro-optic layer and the front electrode or front substrate; a second, typically thin layer of adhesive may or may not be present between the electro-optic layer and a backplane. Such electro-optic displays can combine good resolution with good low temperature performance.

The aforementioned copending application Ser. No. 11/550,114 also describes various methods designed for high volume manufacture of electro-optic displays using inverted front plane laminates; preferred forms of these methods are "multi-up" methods designed to allow lamination of components for a plurality of electro-optic displays at one time.

The aforementioned U.S. Pat. No. 6,982,178 also describes methods for forming an electrical connection between a backplane to which the front plane laminate is laminated and the light-transmissive electrically-conductive layer within the front plane laminate. As illustrated in FIGS. 21 and 22 of this patent, the formation of the layer of electro-optic medium within the front plane laminate may be controlled so as to leave uncoated areas ("gutters") where no electro-optic medium is present, and portions of these uncoated areas can later serve to form the necessary electrical connections. However, this method of forming connections tends to be undesirable from a manufacturing point of view, since the placement of the connections is of course a function of the backplane design, so that FPL coated with a specific arrangement of gutters can only be used with one, or a limited range of backplanes, whereas for economic reasons it is desirable to produce only one form of FPL which can be used with any backplane.

Accordingly, the aforementioned U.S. Pat. No. 6,982,178 also describes methods for forming the necessary electrical connections by coating electro-optic medium over the whole area of the FPL and then removing the electro-optic medium where it is desired to form electrical connections. However, such removal of electro-optic medium poses its own problems. Typically, the electro-optic medium must be removed by the use of solvents or mechanical cleaning, either of which may result in damage to, or removal of, the electrically-conductive layer of the FPL (this electrically-conductive layer usually being a layer of a metal oxide, for example indium tin oxide, less than 1 μm thick), causing a failed electrical connection. In extreme cases, damage may also be caused to the front substrate (typically a polymeric film) which is used to support and mechanically protect the conductive layer. In some cases, the materials from which the electro-optic medium is formed may not be easily solvated, and it may not be possible to remove them without the use of aggressive solvents and/or high mechanical pressures, either of which will exacerbate the aforementioned problems.

Similar methods using selective coating of electro-optic medium and/or selective removal of electro-optic medium may also be applied to the double release films and inverted front plane laminates discussed above.

It is common practice to use laser cutting to separate from a continuous web of FPL pieces of appropriate sizes for lamination to individual backplanes. Such laser cutting can also be used to prepare areas for electrical connections to the backplane by "kiss cutting" the FPL with the laser from the lamination adhesive side so that the lamination adhesive and electro-optic medium are removed from the connection areas, but the electrically-conductive layer is not removed. Such kiss cutting requires accurate control of both laser power and cutting speed if the thin and relatively fragile electrically-conductive layer is not to be removed or damaged. Also, depending upon the location of the connection, bending of the electrically-conductive layer and the associated front substrate may crack the conductive layer, resulting in failure to make a proper connection between the backplane and the conductive layer, and hence display failure.

Accordingly, there is thus a need for improved methods of forming electrical connections to the conductive layers of front plane laminates, and the present invention seeks to provide such improved methods.

Another aspect of the present invention relates to the production of flexible displays. Coating handling, laminating and assembly of displays using thin, flexible substrates is difficult due to the lack of stiffness of the thin substrate materials typically used. These difficulties can be eased somewhat by carrying out some processing steps on continuous webs, but final assembly of flexible displays typically requires lamination of a thin front plane laminate or similar sub-assembly to a thin backplane, and such lamination of two thin sub-assemblies poses substantial mechanical difficulties. One aspect of the present invention relates to a modified lamination process which reduces or eliminates such difficulties.

Another aspect of the present invention relates to improved lamination adhesive layers for use in electro-optic displays. The backplanes used in such displays often have substantial surface roughness, especially where the backplane is of the direct drive type (having a plurality of electrodes of significant size, and a separate conductor associated with each electrode for controlling the voltage thereon) as opposed to an active matrix display. In order to avoid the formation of voids within the lamination adhesive due to the roughness of the backplane, it is desirable to use a relatively soft lamination adhesive (G'<1000 Pa at 70° C. and $10^{-4}$ Hz). However, the use of such a soft adhesive adversely affects the high temperature performance of the display. The present invention provides an adhesive layer which can avoid void formation while still providing good high temperature performance.

Another aspect of the present invention relates to alternatives to the use of front plane laminates in the assembly of electro-optic displays where close alignment tolerances or other desirable parameters are difficult to achieve.

SUMMARY OF THE INVENTION

Accordingly, in one aspect this invention provides a process for the production of a front plane laminate for use in an electro-optic display, the process comprising:
   forming a sub-assembly comprising a layer of lamination adhesive and a layer of electro-optic medium;
   forming an aperture through said sub-assembly; and
   thereafter securing to the exposed surface of the layer of lamination adhesive of said sub-assembly a light-transmissive electrode layer, the electrode layer extending across the aperture.

This process of the present invention may hereinafter for convenience be called the "pre-formed connection aperture" or "PFCA" process of the invention.

In such a PFCA process, the aperture may extend to the edge of the lamination adhesive and electro-optic medium layers, so that the "aperture" is in the form of a cut-out from the edge of these layers rather than a true aperture completely surrounded by the lamination adhesive and electro-optic medium layers. Typically, at least one of the exposed surfaces of the sub-assembly will be covered by a release sheet; the aperture may or may not extend through such a release sheet, but it is usually most convenient for the aperture to extend through the at least one release sheet. The light-transmissive electrode may be carried on a support layer; typically, the electrode layer is part of a front substrate which comprises in addition to the electrode layer, a support layer, typically a polymeric film, which provides mechanical support and protection for what is normally a relatively fragile electrode layer. The sub-assembly may comprise two layers of lamination adhesive on opposed sides of the layer of electro-optic medium, and in such a sub-assembly the aperture will typically extend through both layers of lamination adhesive. For reasons explained below, the light-transmissive electrode may be larger in both dimensions than the layer of electro-optic medium.

The aperture-containing front plane laminate produced by the present process may be used in a manner exactly similar to aperture-containing FPL's produced by mechanical or solvent removal of electro-optic medium and lamination adhesive, as described in the aforementioned U.S. Pat. No. 6,982,178. For example, after the light-transmissive electrode layer has been secured to the layer of electro-optic medium, the lamination adhesive may be laminated to a backplane comprising at least one electrode, a conductive material being introduced into the aperture during this lamination so as to provide an electrical connection between the light-transmissive electrode layer and a contact provided on the backplane. For example, an FPL produced by the PFCA process may be laminated to a backplane on which a droplet of a conductive ink has previously been deposited, so that the conductive ink enters into the aperture in the FPL and forms the necessary electrical connection between the backplane and the conductive layer of the FPL which, following this lamination, forms the front electrode of the electro-optic display.

The electro-optic medium used in the PFCA process may be any solid electro-optic medium of the types previously described. Thus, the electro-optic medium may be a rotating bichromal member or electrochromic medium. The electro-optic medium may also be an electrophoretic material comprising a plurality of electrically charged particles disposed in a fluid and capable of moving through the fluid under the influence of an electric field. The electrically charged particles and the fluid may be confined within a plurality of capsules or microcells. Alternatively, the electrophoretic material may be of the polymer-dispersed type, with the electrically charged particles and the fluid present as a plurality of discrete droplets surrounded by a continuous phase comprising a polymeric material. The fluid used may be liquid or gaseous.

This invention also provides a second, related process for forming a front plane laminate for use in an electro-optic display. In this second process, there is again formed a sub-assembly comprising a layer of lamination adhesive and a layer of electro-optic medium. However, no aperture need be formed through this sub-assembly; instead, a light-transmissive electrode layer is secured to the exposed surface of the lamination adhesive layer of the sub-assembly, the electrode layer having a tab portion which extends beyond the periphery of the layers of lamination adhesive and electro-optic medium. Thus, this invention provides a process for the production of a front plane laminate for use in an electro-optic display, the process comprising: forming a sub-assembly comprising a layer of lamination adhesive and a layer of electro-optic medium; and thereafter securing to the exposed surface of the layer of lamination adhesive of said sub-assembly a light-transmissive electrode layer, the electrode layer having a tab portion which extends beyond the periphery of the layers of lamination adhesive and electro-optic medium.

This second process of the present invention may hereinafter for convenience be called the "extended tab" process of the invention. In this extended tab process, for reasons explained below, the electrode layer may be larger in both dimensions than the layer of electro-optic medium. The sub-assembly may further comprise at least one release sheet covering at least one of the exposed surfaces of the layer of lamination adhesive and the layer of electro-optic medium. As in the PFCA process described above, in the extended tab process, the light-transmissive electrode may be carried on a support layer. The sub-assembly may comprise first and second layers of lamination adhesive disposed on opposed sides of the layer of electro-optic medium. After the light-transmissive electrode layer has been secured to the layer of electro-optic medium, the lamination adhesive may be laminated to a backplane comprising at least one electrode, with the tab portion being contacted with a contact provided on the backplane.

The electro-optic medium used in the extended tab process may be any solid electro-optic medium of the types previously described. Thus, the electro-optic medium may be a rotating bichromal member or electrochromic medium. The electro-optic medium may also be an electrophoretic material comprising a plurality of electrically charged particles disposed in a fluid and capable of moving through the fluid under the influence of an electric field. The electrically charged particles and the fluid may be confined within a plurality of capsules or microcells. Alternatively, the electrophoretic material may be of the polymer-dispersed type, with the electrically charged particles and the fluid present as a plurality of discrete droplets surrounded by a continuous phase comprising a polymeric material. The fluid used may be liquid or gaseous.

In another aspect, this invention provides a process for forming a flexible electro-optic display, the process comprising: providing a backplane comprising at least one electrode; providing a front plane laminate comprising a light-transmissive electrically-conductive layer; a layer of a solid electro-optic medium; an adhesive layer and a release sheet; removing the release sheet from the front plane laminate; and laminating the front plane laminate to the backplane to form an electro-optic display, wherein a stiffening layer is secured to at least one of the front plane laminate and the backplane prior to the lamination, the stiffening layer serving to increase the stiffness of the front plane laminate and/or backplane. The stiffening layer will normally be removed after the lamination.

This process of the present invention may hereinafter for convenience be called the "stiffening layer" process of the invention.

This invention also provides a stiffened front plane laminate comprising, in order, a stiffening layer, a light-transmissive electrically-conductive layer; a layer of a solid electro-optic medium in electrical contact with the electrically-conductive layer; an adhesive layer and a release sheet, the stiffening layer being removable from the electrically-conductive layer.

The stiffening layer process and stiffened front plane laminate of the present invention may make use of any of the known types of solid electro-optic media, as previously described.

This invention also provides an electro-optic display comprising a backplane having at least one electrode; a first layer of non-cross-linked adhesive in contact with the backplane; a second layer of cross-linked adhesive on the opposed side of the first layer from the backplane; and a layer of electro-optic medium on the opposed side of the second layer from the first layer. Such an electro-optic display may hereinafter for convenience be called the "double adhesive layer" display of the present invention.

This invention also provides a front plane laminate comprising, in order, a light-transmissive electrically-conductive layer; a layer of an electro-optic medium; a layer of cross-linked adhesive; a layer of non-cross-linked adhesive; and a release sheet. Such a front plane laminate may hereinafter be called a "double adhesive layer front plane laminate" or "DALFPL" of the present invention.

This invention also provides a double release film comprising: a layer of a solid electro-optic medium having first and second surfaces on opposed sides thereof; a first adhesive layer on the first surface of the layer of solid electro-optic medium; a second adhesive layer on the second surface of the layer of solid electro-optic medium; and a release sheet disposed on the opposed side of the first adhesive layer from the layer of solid electro-optic medium, wherein one of the first and second adhesive layers comprises a first sub-layer of cross-linked adhesive adjacent the surface of the layer of solid electro-optic medium, and a second sub-layer of non-cross-linked adhesive. Such a double release film may hereinafter be called a "double adhesive layer double release film" or "DALDRF" of the present invention.

Electro-optic displays produced using the methods and components of the present invention can be used in any of the applications in which electro-optic displays have previously been used. Accordingly, this invention extends an electronic book reader, portable computer, tablet computer, cellular telephone, smart card, sign, watch, shelf label or flash drive comprising a display of the present invention, or produced using a method or component of the present invention.

Finally, this invention provides various processes for assembling electro-optic displays without the use of front plane laminates.

BRIEF DESCRIPTION OF DRAWINGS

FIGS. 3A to 3D are schematic cross-sections illustrating various stages of an extended tab process of the present invention, while

FIGS. 6A to 6E are schematic sections illustrating various states of a process of the present invention for forming an electro-optic display without using a front plane laminate.

Figure 1A:
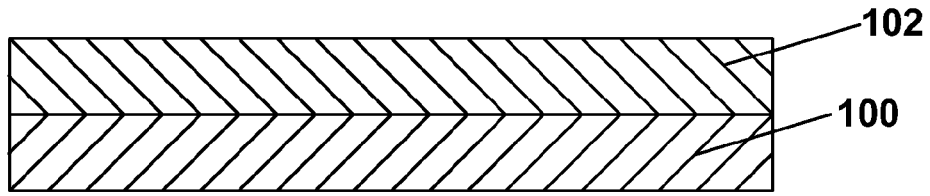
FIGS. 1A to 1D are schematic cross-sections illustrating various stages of a first pre-formed connection aperture process of the present invention.
Figure 1B:
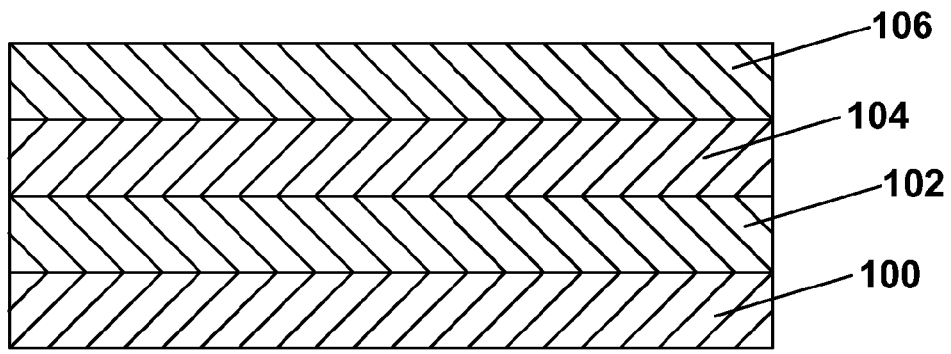

It should be stressed that all the accompanying drawings are schematic and not to scale. In particular, for ease of illustration, the thicknesses of the various layers in the drawings do not correspond to their actual thicknesses. Also, in all the drawings, the thicknesses of the various layers are greatly exaggerated relative to their lateral dimensions.

DETAILED DESCRIPTION

As will be apparent from the foregoing Summary of the Invention, the present invention has a number of different aspects. These various aspects will primarily be described separately below, but it should be recognized that a single electro-optic display or component thereof may make use of multiple aspects of the present invention. For example, a sub-assembly used in a PFCA process of the invention may incorporate a double adhesive layer of the present invention.

Before describing in detail the various aspect of the present invention it is useful to set out certain definitions. The term "backplane" is used herein consistent with its conventional meaning in the art of electro-optic displays and in the aforementioned patents and published applications, to mean a rigid or flexible material provided with one or more electrodes. The backplane may also be provided with electronics for addressing the display, or such electronics may be provided in a unit separate from the backplane. In flexible displays, it is highly desirable that the backplane provide sufficient barrier properties to prevent ingress of moisture and other contaminants through the non-viewing side of the display (the display is of course normally viewed from the side remote from the backplane). If one or more additional layers need to be added to the backplane to reduce ingress of moisture and other contaminants, the barrier layers should be located as closely as possible to the electro-optic layer so that little or no edge profile of low barrier materials is present between the front (discussed below) and rear barrier layers.

The term "front substrate" is used consistent with its conventional meaning in the art of electro-optic displays and in the aforementioned patents and published applications, to mean a rigid or flexible material that is light-transmissive (and preferably transparent). The front substrate comprises at least one electrode layer, most commonly a single continuous front electrode extending across the entire display. Typically, the exposed surface of the front substrate will form the viewing surface through which an observer views the display, although there may be additional layers interposed between the front substrate and the viewing surface. As with the backplane, the front substrate should provide sufficient barrier properties to prevent ingress of moisture and other contaminants through the viewing side of the display. If one or more additional layers need to be added to the front substrate to reduce ingress of moisture and other contaminants, the barrier layers should be located as closely as possible to the electro-optic layer so that little or no edge profile of low barrier materials is present between the front and rear barrier layers.

Section A: PFCA and Extended Tab Processes

These aspects of the present invention are grouped together because they share the same objectives, namely reducing or eliminating the need for mechanical or solvent clearing of the electrode layer in order to form an electrical connection between this layer and the backplane, and reducing the risk of cracking or damaging the electrode layer (especially a brittle metal oxide layer, for example an indium tin oxide layer) when using thin substrates.

Figure 1C:
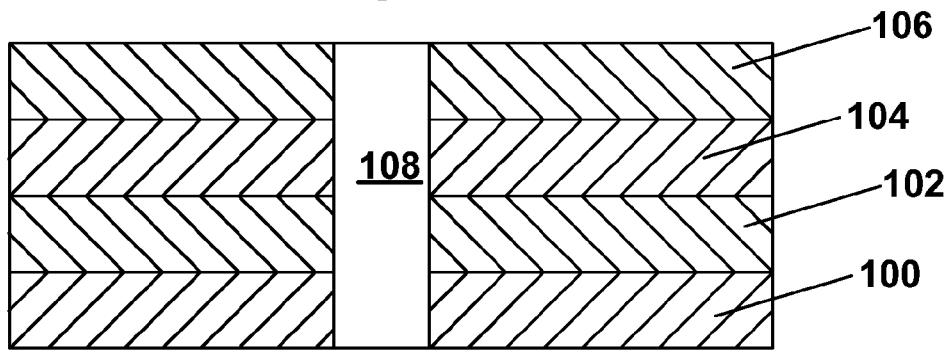
Figure 1D:
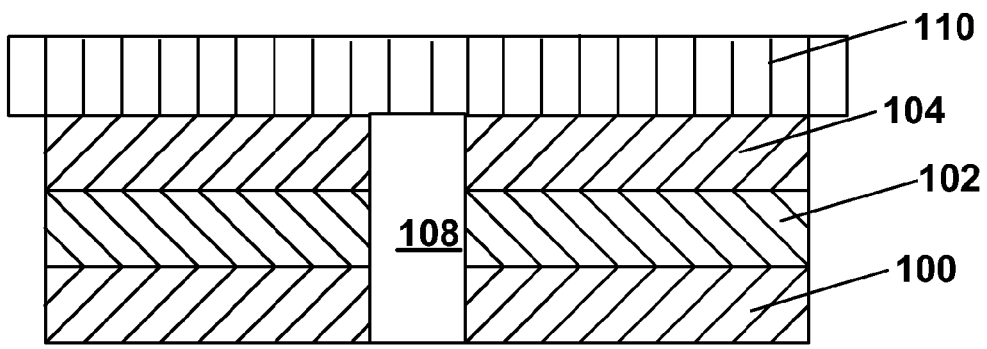

FIGS. 1A to 1D are schematic sections through a sub-assembly and front plane laminate formed by a first PFCA process of the present invention. As illustrated in FIG. 1A, the process begins by coating a layer of electro-optic medium 102 on a first release sheet 100 (deposition techniques other than coating may be useful depending upon the exact type of electro-optic medium used). In the next stage of the process, a layer of lamination adhesive 104 is coated on a second release sheet 106 and the resultant sub-assembly laminated to the electro-optic medium layer 102 on the first release sheet 100 so that the lamination adhesive layer 104 is secured to the electro-optic medium layer 102, to produce the sub-assembly shown in FIG. 1B. An aperture 108 is then cut through the sub-assembly, as shown in FIG. 1C. Finally, the second release sheet 106 is removed, and an electrode layer 110 is laminated to the adhesive layer 104 so that the electrode layer 110 extends across the aperture 108, as illustrated in FIG. 1D. (In practice, the electrode layer 110 would normally be supported on a support sheet, but the support sheet is omitted from FIG. 1D for simplicity).

It will be seen that, in FIG. 1D, the electrode layer 110 is shown as larger than the adhesive layer 104 and the electro-optic medium layer 104. This is deliberate, since the final front plane laminate shown in FIG. 1D is intended for use in the production of an electro-optic display with a so-called "underfill" edge seal, as described in the aforementioned U.S. Pat. No. 6,982,178. To produce such an underfill seal, the backplane, the electrode layer and the front support layer (when present) are all made larger in both dimensions than the intervening adhesive and electro-optic medium layers, so that after the front plane laminate has been laminated to the backplane a sealing material can be injected between the backplane and the electrode or front support and cured to form an edge seal completely surrounding the adhesive and electro-optic medium layers.

It will readily be apparent than numerous variations are possible in the basic PFCA process illustrated in FIGS. 1A to 1D. For example, a variety of techniques may be used to form the aperture 108, including mechanical punching or drilling, or laser cutting. The aperture 108 could extend to the periphery of the electro-optic medium layer 102 and the adhesive layer 104 so as to form a cut-out in the edge of these layers rather than a true aperture. It is not strictly necessary to coat the adhesive layer 104 on a second release sheet; depending upon the specific adhesive and electro-optic medium employed, it may be possible to coat the adhesive layer directly on to the electro-optic medium layer.

The process illustrated in FIGS. 1A to 1D also allows considerable flexibility as to which operations are performed on continuous webs of material and which are performed on cut pieces of material sized for individual displays (or possibly sized for a small number of displays produced in a single lamination operation). The steps illustrated in FIGS. 1A and 1B would normally be carried out on continuous webs of material. The formation of the aperture 108 might be done either on a continuous web or on cut pieces of material. The final lamination to the "oversized" electrode layer 110 would normally be effected on cut pieces of material.

It will be appreciated that, as illustrated in FIGS. 1A to 1D, the process does not provide the adhesive layer typically present between the electro-optic medium layer 102 and its associated release sheet 100. In the form shown in FIGS. 1A to 1D, the final front plane laminate may be used in a process in which a lamination adhesive is placed on the backplane, or in which no lamination adhesive is needed because, for example, the electro-optic medium is an encapsulated electrophoretic medium in which the capsules are embedded in a polymeric binder which can itself serve as a lamination adhesive, as described in certain of the aforementioned E Ink patents and applications. If it is desired to provide the FPL produced in the process of FIGS. 1A to 1D with a second layer of lamination adhesive on the opposed side of the electro-optic medium layer from the adhesive layer 104, this may readily be done by modifying the process by removing release sheet 100 from the sub-assembly shown in FIG. 1B and laminating to the electro-optic medium layer 102 a second lamination adhesive layer carried on a third release sheet cf. the description of FIGS. 2A to 2E below. In this modified process, the aperture 108 could of course extend through both adhesive layers.

Figure 2A:
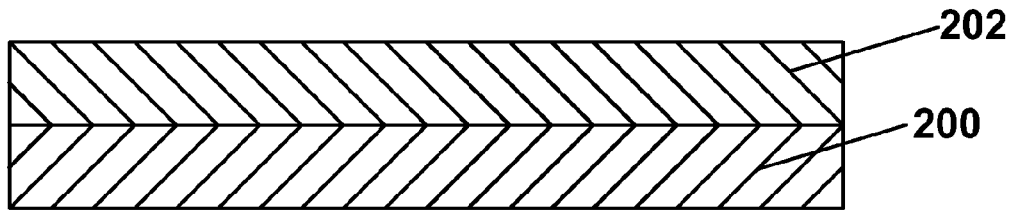
FIGS. 2A to 2E are schematic cross-sections illustrating various stages of a second pre-formed connection aperture process of the present invention.
Figure 2B:
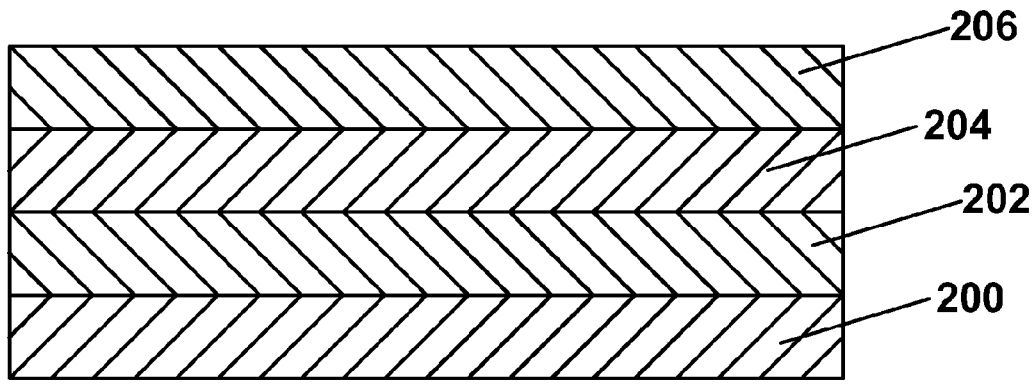
Figure 2C:
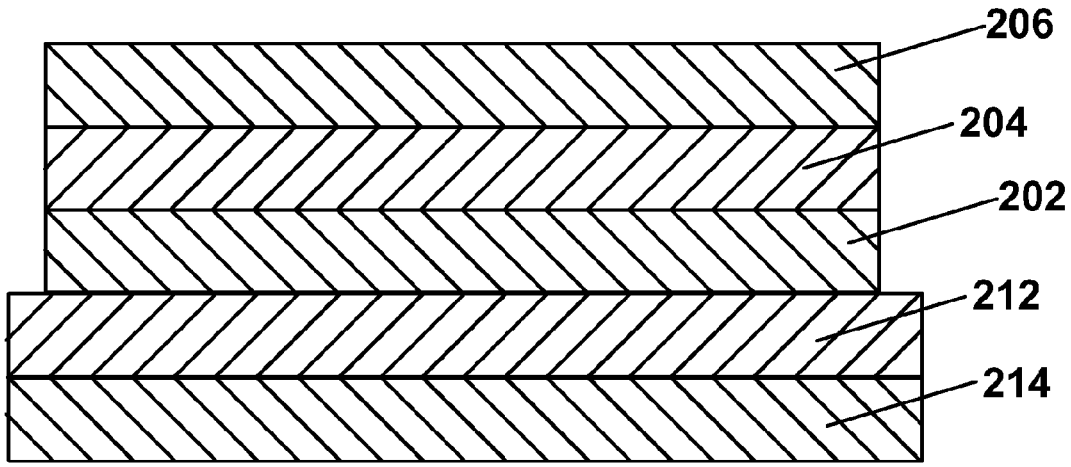
Figure 2D:
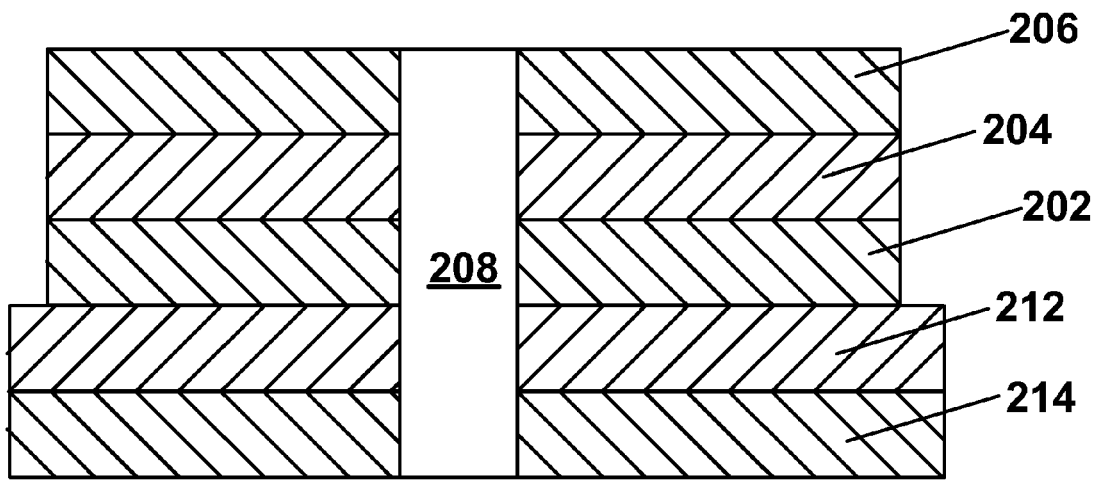
Figure 2E:
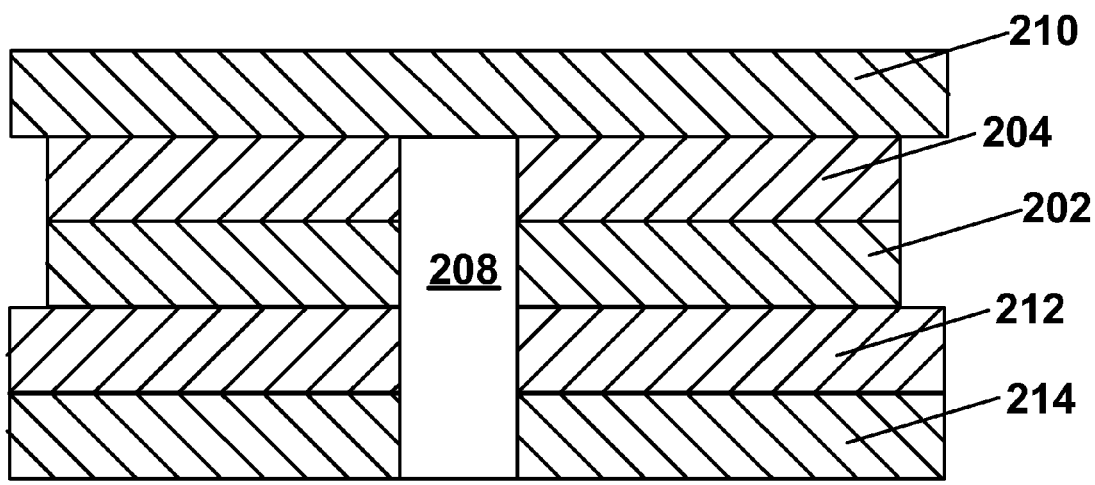

FIGS. 2A to 2E illustrate a second preferred PFCA process of the present invention. The first two steps of this process, illustrated in FIGS. 2A and 2B, and carried out using a first release sheet 200, an electro-optic medium layer 202, an adhesive layer 204 and a second release sheet 206, are identical to the corresponding steps illustrated in FIGS. 1A and 1B. However, the next step of the second preferred PFCA process comprises removing the first release sheet 200 and laminating to the thus-exposed surface of the electro-optic medium layer 202 a second lamination adhesive layer 212 carried on a third release sheet 214, as illustrated in FIG. 2C. The remaining steps of the process are the formation of an aperture 208 through all five layers of the structure shown in FIG. 2C, to produce the apertured structure shown in FIG. 2D, and the removal of the second release sheet 206 and lamination of an electrode layer 210, which extends across the aperture 208, to produce the finished front plane laminate shown in FIG. 2E. Note that in this second process both the second lamination adhesive layer 212 and the electrode layer 210 are made larger than the intervening electro-optic medium layer 202 and the adhesive layer 204; although not apparent from FIG. 2E, this difference in size exists in both dimensions, and is provided so that, during the final lamination to produce the front plane laminate shown in FIG. 2E, the peripheral portions of the second lamination adhesive layer 212 will bond to the electrode layer, thus forming an edge seal around the electro-optic medium layer 202 (the thicknesses of the layers in FIGS. 2A to 2E are of course greatly exaggerated relative to their lateral dimensions).

In the second PFCA process shown in FIGS. 2A to 2E, the first two steps (to produce the structure shown in FIG. 2B) will typically be carried out on continuous webs of material and the remaining steps on pieces of material cut to size for individual displays.

Figure 3A:
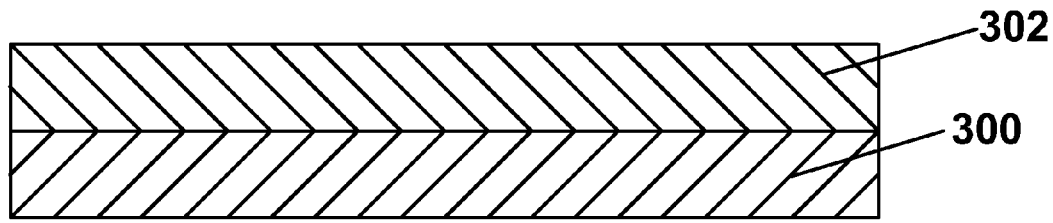
Figure 3B:
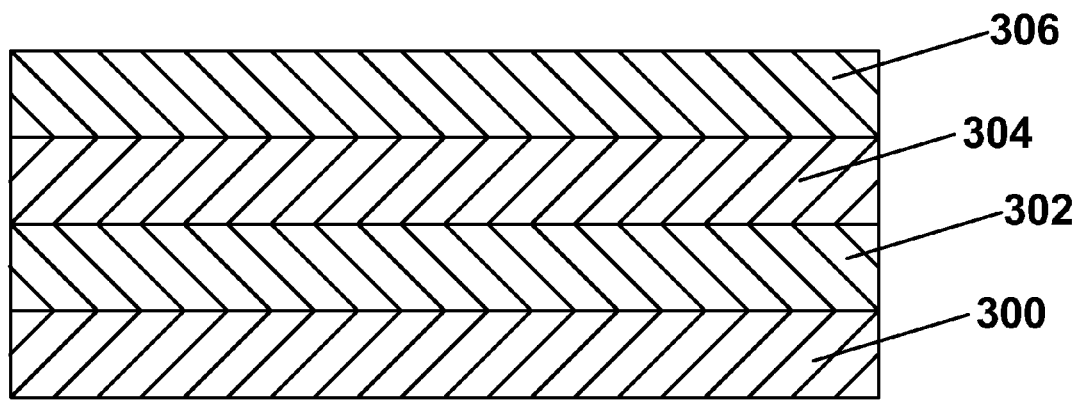
Figure 3C:
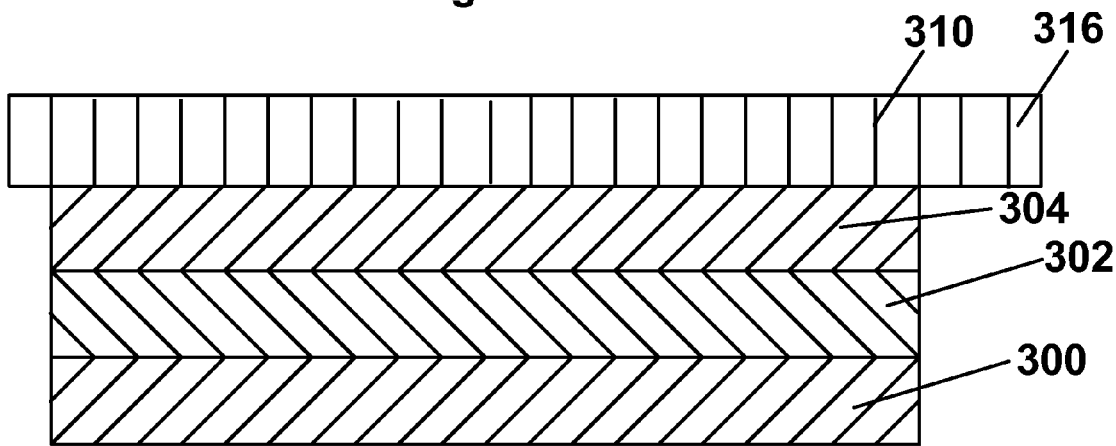
Figure 3D:
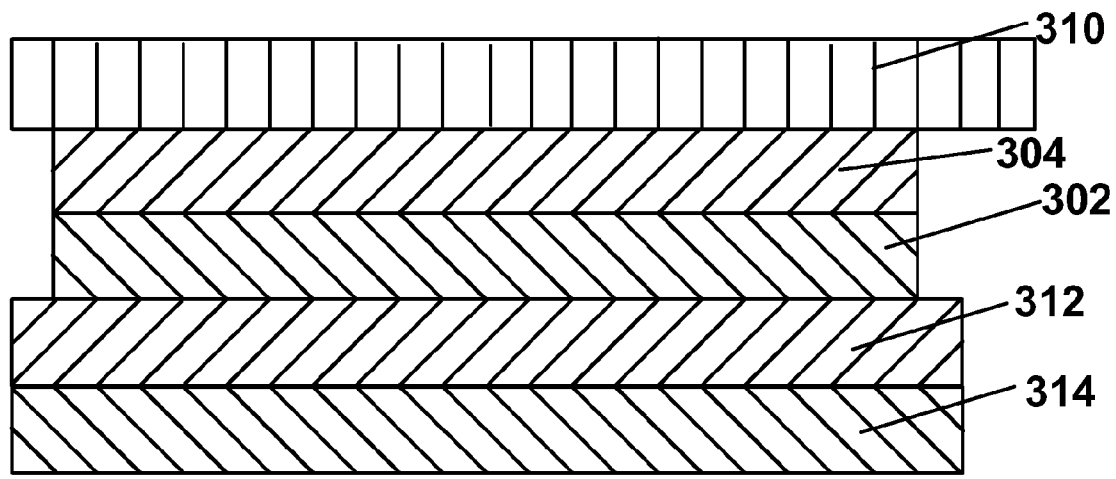
Figure 3E:
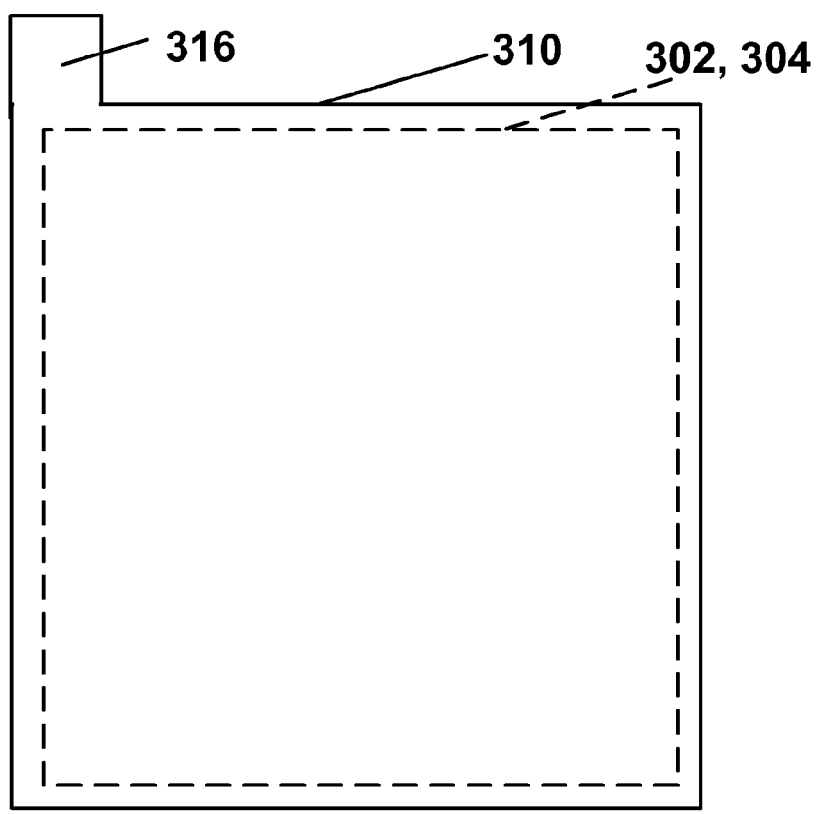
FIG. 3E is a top plan view of the same stage of the process as FIG. 3C.

FIGS. 3A to 3E illustrate a preferred extended tab process of the present invention. The first two steps of this process, illustrated in FIGS. 3A and 3B, and carried out using a first release sheet 300, an electro-optic medium layer 302, an adhesive layer 304 and a second release sheet 306, are identical to the corresponding steps illustrated in FIGS. 1A and 1B. The next step of the process, namely removal of the second release sheet 306 and lamination of an electrode layer 310, is also generally similar to the first PFCA process, but no aperture is formed and, as illustrated in FIGS. 3C and 3E, the electrode layer 310 is slightly larger in both dimensions than the electro-optic medium layer 302, and is also provided with a projecting tab 316 which will eventually be used to connect the electrode layer 310 to a backplane.

The last step of the extended tab process is generally similar to that of the second PFCA process described above; the first release sheet 300 is removed and the thus-exposed surface of the electro-optic medium layer 302 is laminated to a second lamination adhesive layer 312 carried on a third release sheet 314, as illustrated in FIG. 3D. Again, the relative sizes of the various layers of the final front plane laminate are designed to ensure that during the final lamination, the second adhesive layer 312 becomes bonded to the electrode layer 310, thus forming an edge seal around the electro-optic medium layer 302.

As already indicated, in the PFCA process of the present invention the "aperture" may be either a true aperture or a cut-out from an edge of the electro-optic medium and adhesive layers, while the extended tab process of the present invention does not require the formation of any aperture. Each of these approaches to providing an electrical connection has advantages and disadvantages. Locating an aperture in the interior of the electro-optic medium and adhesive layers (i.e., using a PFCA process with a true aperture rather than a cut-out) allows for a compact design, but does not allow the entire active area of the electro-optic medium to be used for the display, since it is necessary to hide the connection area. The strain on the front electrode is low and there is no risk of compromising the edge of the display since the connection area is spaced from the edge seal. Using a PFCA process with a cut-out can improve the use of the active area of the electro-optic medium while keeping the strain on the connection low. However, there is some risk of comprising the edge seal at the location of the cut-out. Use of an external tab process allows the entire active area of the electro-optic medium to be used, but does require additional space on the backplane to accommodate the external tab. There may be a tendency for the strain on the external tab connection to be greater than in a PFCA process, but there is little or no risk of compromising the edge seal of the display. In all cases, the use of multiple connections may be desirable to minimize the possibility of display failure due to poor electrical connections or strain on such connections.

The PFCA and extended tab displays of the present invention may include various additional layers to enhance the protection of the electro-optic medium from materials, especially moisture, present in the environment. As discussed in the aforementioned U.S. Pat. Nos. 6,982,178 and 7,110,164, and Patent Publication No. 2004/0155857, and in the aforementioned copending application Ser. No. 11/612,732, one preferred form of front substrate for electro-optic displays comprises a thin layer of ITO on poly(ethylene terephthalate) (PET), such coated films being readily available commercially. In such a front substrate, the ITO layer serves as a barrier material, but in practice inevitably suffers from pinholes and cracks, through which moisture and other contaminants can penetrate to the electro-optic medium. To increase the sealing properties of such a PET/ITO or similar front substrate, it is desirable to laminate a redundant barrier layer on to the front substrate, this redundant barrier layer being formed of a homopolymer (for example, polychlorotrifluoroethylene, available from Honeywell Corporation under the Registered Trade Mark "ACLAR"), or a sputtered ceramic (for example $AlO_x$, available from Toppan Printing Company of under the trade name Toppan GX Film). When a flexible display is desired, the redundant barrier layer should be thin, ideally about 12 μm, but could be as thick as 5 mil (127 μm) if sufficient flexibility is still available. Where an adhesive layer is required to attach the redundant barrier to the front substrate, the adhesive layer should be transparent, colorless, thin, flexible, have low creep (when the display is flexed or rolled), and be durable at all temperatures within the operating range of the display. Certain cross-linked polyurethanes and polyacrylates can be used as such adhesives.

Alternatively, the barrier properties of a PET/ITO or similar front substrate may be improved by coating a redundant metal oxide layer (for example, an alumina layer) either on the opposed surface of the front substrate from the ITO layer or underneath the ITO layer. The combination of the ITO layer and the redundant metal oxide layer improves the barrier properties of the front substrate (for example by reducing migration of water vapor through the inevitable cracks and pinholes in the ITO layer) without undue yellowing of the substrate, such as would occur one attempted to improve barrier properties by increasing the thickness of the ITO layer. Instead of a simple metal oxide layer, a more complex structure containing a ceramic material, such as Barix (Registered Trade Mark) sealing material, available from Vitex Systems, Inc., 3047 Orchard Parkway, San Jose, Calif. 95134 could be used; again the barrier layer could be provided on the surface of the front substrate remote from the ITO layer or beneath the ITO layer. Vitex Systems currently sells a polymer film bearing both Barix and ITO layers under the trade name FlexGlass 200, but the polymeric film is 5 mil (127 μm) PEN.

The barrier properties of the front substrate, as well as properties such as flexibility, cost and other specialized properties, may also be controlled by careful choice of both the polymer and conductive material used in the front substrate. Almost any flexible, light-transmissive polymer may in principle be used; suitable polymers include PET, PEN, polycarbonate, poly(vinylidene chloride) (sold under the Registered Trade Mark "SARAN"), polychlorotrifluoroethylene (sold under the Registered Trade Marks "ACLAR" and "CLARIS"), triacetyl cellulose, the material sold under the Registered Trade Mark "ARTON" by JSR Company, polyethersulfone (PES) and laminates of two or more of these materials. Suitable transparent conductive materials include ITO, organic conductive polymers such as Baytron P®, carbon nanotubes, and other suitably conducting light transmissive conductors (T>60 percent) having resistivities of less an about $10^4$ ohms/square.

In the PFCA and extended displays of the present invention, the electro-optic layer may be an encapsulated electrophoretic layer, a polymer-dispersed electrophoretic layer, or any of the other types of electro-optic layer discussed above. The display may contain one or two lamination adhesive layers to attach the electro-optic material to the front substrate and/or the backplane. The display may be viewed through either lamination adhesive layer, and the display may be assembled by direct coating and lamination, or by the use of front plane laminates, inverted front plane laminates, or double release films, as described in the patents and applications mentioned in the "Related Applications" Section hereof. Although as mentioned above, the display is normally viewed through the front substrate, in some cases a light-transmissive backplane can be used to provide a double-sided display, or one operating in the aforementioned shutter mode. The display may be provided with any of the types of edge seal described in the aforementioned application Ser. No. 11/612,732, or those described below.

From the foregoing it will be seen that the PFCA and extended tab processes of the present invention reduce or eliminate many of the problems previously encountered in providing electrical connections to common electrodes in electro-optic displays, and avoid the need for mechanical cleaning of electro-optic medium from a front electrode layer.

Section B: Stiffened Front Plane Laminates and Processes

As already indicated, in another aspect this invention provides a modification of the process for forming an electro-optic display using a front plane laminate as described in the aforementioned U.S. Pat. No. 6,982,178. In accordance with the present invention, the process is modified by securing a stiffening layer to at least one of the front plane laminate and the backplane before the front plane laminate is laminated to the backplane to form the electro-optic display. After the lamination, the stiffening layer will typically be removed. In saying that the stiffening layer may be secured to the front plane laminated prior to the lamination to the backplane, we do not exclude the possibility that the FPL may be manufactured with the stiffening layer in place, and indeed this may often be the most convenient approach, since the stiffening effect provided by the stiffening layer may be useful during the manufacture of the FPL itself, as well as during its lamination to the backplane. For example, when it is desired to prepare an FPL starting from a thin, flexible substrate comprising (say) ITO on PET, it may be advantageous to first secure the substrate to a stiffening layer, then prepare the FPL by coating the electro-optic medium, followed by the adhesive layer, on to the substrate, and finally covering the adhesive with a release sheet. In such a process, increased stiffness of the substrate provided by the stiffening layer may provide beneficial improvements in tensioning and uniformity if (as is normally the case), the coating processes are carried out on a web. The resultant FPL may then be laminated to a backplane in the usual manner to form an electro-optic display, and the stiffening layer removed from the final display.

Figure 4:
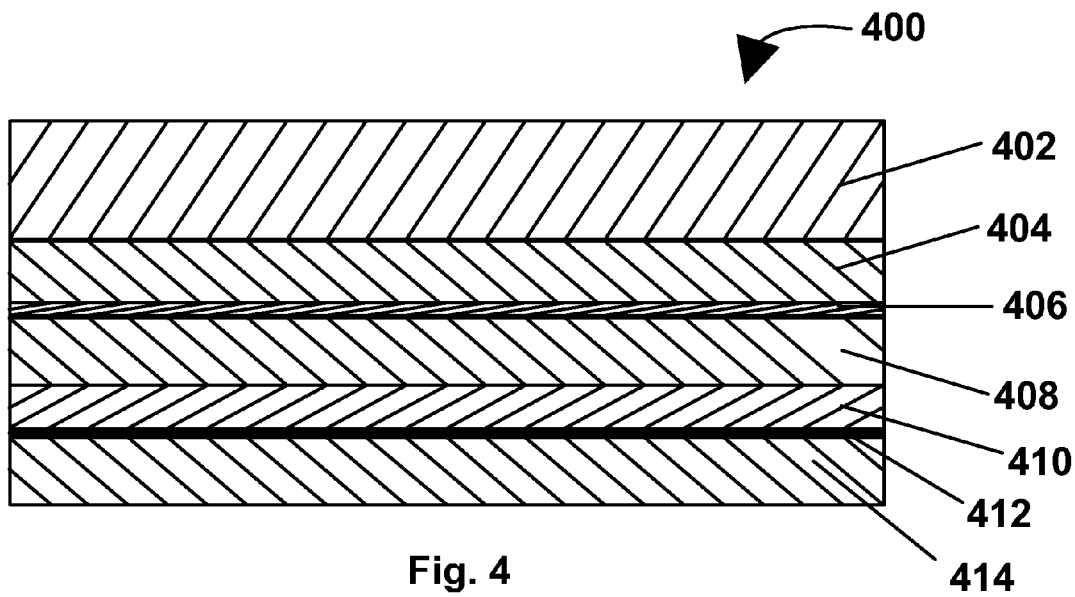
FIG. 4 is a schematic section through a stiffened front plane laminate of the present invention.

FIG. 4 is a schematic cross-section through a stiffened front plane laminate (generally designated 400) of the present invention. The front plane laminate 400 comprises a stiffening layer 402, a polymeric support layer 404, a light-transmissive electrically-conductive layer 406, an electro-optic medium layer 408, a lamination adhesive layer 410, and a release sheet 414 provided, on its surface facing the lamination adhesive layer, with a conductive layer 412; this conductive layer 412 is used, as described in the aforementioned U.S. Pat. No. 6,982,178 and as briefly described above, for testing the electro-optic medium prior to incorporation of the FPL into a display.

In a stiffened FPL of the present invention, the electro-optic medium and adhesive layers can be of any of the types described in the aforementioned U.S. Pat. Nos. 6,982,178; 7,075,703 and 7,110,164; Publication 2004/0155857; and copending application Ser. Nos. 11/550,114; and 11/612,732. For example, the electro-optic medium may be an encapsulated electrophoretic medium, a polymer-dispersed electrophoretic medium, a rotating bichromal member medium, a microcell electrophoretic medium or any of the other types of electro-optic medium discussed above. The FPL may be of the conventional type described in U.S. Pat. No. 6,982,178, with the adhesive layer adjacent the release sheet, or of the inverted type described in the aforementioned application Ser. No. 11/550,114, in which the order of the electro-optic medium layer and the adhesive layer is reversed, so that the electro-optic medium layer lies closer to the release sheet. The "FPL" may also have the form of a double release sheet comprising a single layer of electro-optic medium sandwiched between two separate adhesive layers.

Whether present on the front plane laminate, the backplane or both, the stiffening layer can be made from a wide variety of materials. Typically, the stiffening layer will be a polymeric film, and may be formed from, for example, polyethylene, polypropylene, poly(ethylene terephthalate) or other polymers. The stiffening layer may be secured to the front plane laminate or the backplane by a releasable adhesive, or by static cling.

As already indicated, a typical assembly sequence for an electro-optic display using a stiffened front plane laminate of the present invention would be to remove the release sheet and laminate the FPL to a backplane (which may or may not be stiffened with an additional stiffening layer). If a edge sealing material is to be dispensed around the periphery of the display and cured to form an edge seal, this is normally done as the next stage of the process. Finally, the stiffening layer(s) are removed.

A stiffening layer can also be used at other stages in the assembly of electro-optic displays to aid in the processing of thin layers. For example, if a composite front substrate of an electro-optic display is to be assembled from individual layers (such as a 0.5 mil (13 µm) ITO/PET film and a 0.5 mil (13 µm) AlO$_x$/PET film), a stiffening layer can be applied to one of the films to allow a bonding adhesive to be coated prior to laminating the two layers together. Such a stiffening layer may be left in place to aid in downstream processing.

The electro-optic displays produced using stiffening films in accordance with the present invention may incorporate any of the known types of additional sealing layers or edge seals to isolate the electro-optic medium from the environment, as discussed in Section A above.

Section C: Double Adhesive Layer Displays and Front Plane Laminates

As already mentioned, in prior art electro-optic displays and front plane laminates, the choice of lamination adhesive has involved a compromise between the need for good lamination quality to avoid the formation of voids within the adhesive layer and the high temperature performance of the display. To provide good lamination quality, it is desirable to use a soft adhesive (G'<1000 Pa at 70° C. and $10^{-4}$ Hz), but such an adhesive does not give good high temperature performance in the finished electro-optic display due to its low cohesive strength; a stiffer, more elastic adhesive is needed to improve high temperature performance.

In accordance with the present invention, the aforementioned compromise is avoided by using a double layer of adhesive, with a non-cross-linked adhesive layer adjacent the backplane to provide good backplane conformity, i.e., the soft adhesive provides the flow properties needed for good bonding with relatively rough backplanes, and a cross-linked adhesive layer adjacent the electro-optic medium; this cross-linked adhesive layer prevents void growth by preventing out-gassing of volatile components from the electro-optic layer. The cross-linked adhesive may also serve as a moisture barrier to maintain a constant moisture level within the electro-optic medium; this can be important, since the electro-optic performance of many types of electro-optic media varies with the moisture content of the media.

The relative thickness of the two adhesive layers can vary and the optimum thicknesses for any specific combination of adhesives, cross-linking agents and electro-optic medium is best determined empirically. However, by way of general guidance it has been found that making the two adhesive layers of substantially the same thickness generally gives good results. For example, each of the adhesive layers may have a thickness of about 25 µm.

Figure 5:
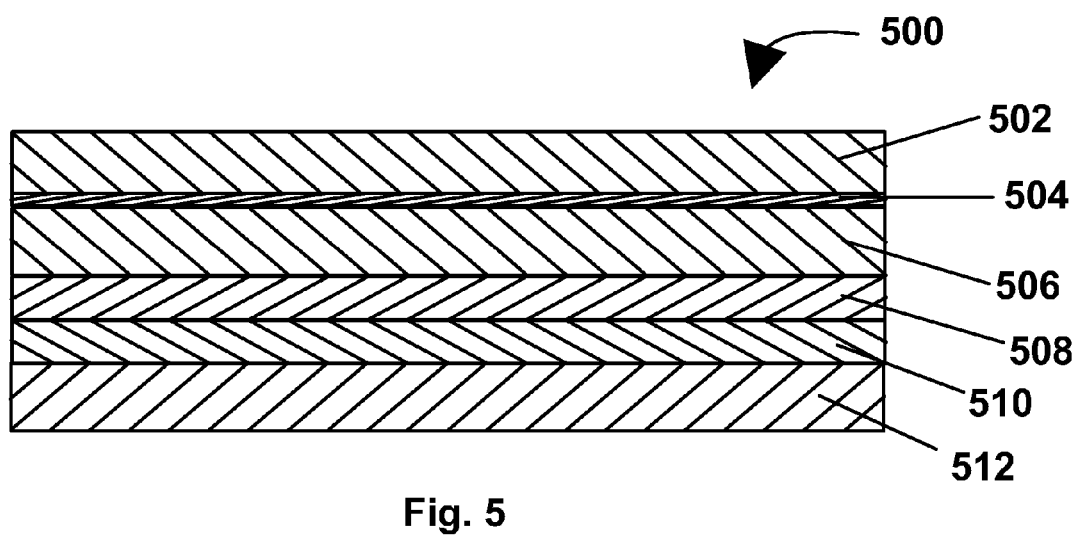
FIG. 5 is a schematic section through a double adhesive layer electro-optic display of the present invention.

FIG. 5 of the accompanying drawings is a schematic cross-section through a double adhesive layer electro-optic display (generally designated 500) of the present invention. The display 500 comprises a front substrate 502, a light-transmissive electrode layer 504, an electro-optic layer 506, a cross-linked adhesive layer 508 (which may be formed, for example, from a polyurethane adhesive cross-linked with diglycidylaniline), a non-cross-linked adhesive layer 510 (which may be formed from a non-cross-linked polyurethane), and a backplane 512 provided with pixel electrodes (not shown).

It will readily be seen that the display 500 can readily be formed using a double adhesive layer front plane laminate of the present invention; such a DALFPL can be similar to the FPL 400 shown in FIG. 4 except that the single adhesive layer of the FPL 400 would be replaced by the double adhesive layer 508, 510 shown in FIG. 5.

To illustrate the advantages of the present invention, experimental single-pixel displays were prepared. These displays were substantially as shown in FIG. 5 except that the backplane comprised a single gold electrode placed upon an insulating backplane larger than the gold electrode so as to leave a peripheral portion of the insulating backplane exposed all around the gold electrode. A protective sheet was provided covering the exposed surface of the front substrate and having a peripheral portion extending outwardly beyond the edges of the front substrate. A sealing material was injected between the peripheral portions of the backplane and the protective sheet to form a edge seal, thus forming a sealed display generally similar to that shown in FIG. 20 of the aforementioned U.S. Pat. No. 6,982,178.

The electro-optic medium used in the displays was an encapsulated electrophoretic medium comprising an internal phase of polymer-coated titania and polymer-coated carbon black in a hydrocarbon fluid, encapsulated within gelatin/acacia capsules and prepared substantially as described in Paragraphs [0067] to [0074] of U.S. Patent Publication 2002/0180687. The double adhesive layer used comprised 25 µm layers of cross-linked and non-cross-linked custom polyurethane adhesive; control displays were prepared with a single 50 µm layer of the same non-cross-linked adhesive.

Both the test and control displays were stored and 75° C. and in a dry atmosphere, and their switching abilities tested at intervals. The double adhesive layer displays of the present invention showed no void growth after 664 hours at 75° C., while the control displays using a single adhesive layer developed voids in less than 24 hours. The displays of the present invention also failed to show voids at 348 hours at 60° C. and 80 percent relative humidity, and 348 hours at 40° C. and 90 percent relative humidity; in each case, the control displays showed void growth after much shorter periods of storage.

The double adhesive layer electro-optic displays of the present invention may incorporate any of the known types of additional sealing layers or edge seals to isolate the electro-optic medium from the environment, as discussed in Section A above.

Section D: Forming Electro-Optic Displays without Front Plane Laminates

Assembling complex electro-optic displays with integrated barrier layers and/or edge seals can be a complicated process. It is possible to deliver to a manufacturer a front plane laminate containing all required layers of the final display, but forming this front plane laminate may require alignment of various layers during several lamination steps. Depending upon the alignment tolerances required, it may not be possible to form the FPL using web or sheet based processes. Typically, the edge seals will still need to be formed individually for each display by the manufacturer. It may also be desirable for manufacturing and inventory reasons to avoid assembling an entire FPL structure before delivery to the manufacturer of the final display.

Thus, depending upon the positional accuracy required for the laminations, it may be advantageous to form an electro-optic display layer-by-layer rather than by providing an integrated FPL. Such a layer-by-layer approach may also have manufacturing advantages by allowing each layer to be separately coated, converted and inspected in such a manner as is required to achieve cost efficiency for that layer alone. The approach also allows flexibility in delivering different layers to different manufacturers of displays with the layers custom tailored to their individual needs without requiring the manufacture of a fully assembled FPL for each manufacturer.

Various techniques for layer-by-layer assembly of electro-optic displays are described in the aforementioned U.S. Pat. No. 7,110,164, and these techniques will not be repeated here. Instead, the present discussion will focus, by way of example, upon processes for the preparation of the electro-optic display (generally designated 600) shown in FIG. 6E of the accompanying drawings, although it will be understood that any structure compatible with edge seals and front substrate requirements may be used. The electro-optic display 600 (which is identical to that shown in FIG. 9 of the aforementioned copending application Ser. No. 11/612,732), comprises a front substrate 602, having barrier properties and bearing on its lower surface (as illustrated in FIG. 6E) a thin, transparent electrically-conductive layer (not shown separately in FIG. 6E). The display 600 further comprises an upper lamination adhesive layer 604, an electro-optic layer 606, a lower lamination adhesive layer 608, and a backplane 610, which has barrier properties similar to those of the front substrate 602. The front substrate 602 and the backplane 610 are both made larger in both dimensions than the intervening layers 604, 606 and 608 so that peripheral portions 602P and 610P of the front substrate 602 and the backplane 610 respectively extend outwardly beyond the edges of these intervening layers. An edge seal 612 extends between the peripheral portions 602P and 610P, thus forming a complete seal around the electro-optic layer 606.

FIGS. 6A to 6D illustrate successive stages in the manufacture of the electro-optic display 600. One preferred process for forming the electro-optic display begins with a web of the lower lamination adhesive layer 608 sandwiched between first and second release sheets; such a web can of course be prepared by coating the adhesive layer on one release sheet and covering the coated layer with the other release sheet. A piece of the size required to provide the lower lamination adhesive layer 608 shown in FIG. 6E is cut from the web, the first release sheet is removed, and the adhesive layer 608 and the second release sheet 614 are laminated to the backplane 610 to form the structure shown in FIG. 6A.

In the next step of the process, a web of the electro-optic layer 606 is formed sandwiched between third and fourth release sheets; such a web can of course be prepared by coating the electro-optic layer on one release sheet and covering the coated layer with the other release sheet. A piece of the size required to provide the electro-optic layer 606 shown in FIG. 6E is cut from the web, and the third release sheet is removed. Also, the second release sheet 614 is removed from the structure shown in FIG. 6A. The electro-optic layer/fourth release sheet is then laminated to the lower adhesive layer to produce the structure shown in FIG. 6B, in which the electro-optic layer 606 is covered by the fourth release sheet 616.

The third stage of the process is closely analogous to the first. A web of the upper lamination adhesive layer 604 sandwiched between fifth and sixth release sheets is prepared, and a piece of the size required to provide the upper lamination adhesive layer 604 shown in FIG. 6E is cut from the web. The fifth release sheet is removed, the fourth release sheet is removed from the structure shown in FIG. 6B, and the upper adhesive layer 604 is laminated to the electro-optic layer 606 to produce the structure shown in FIG. 6C, in which the adhesive layer 604 is covered by the sixth release sheet 618.

Figure 6C:
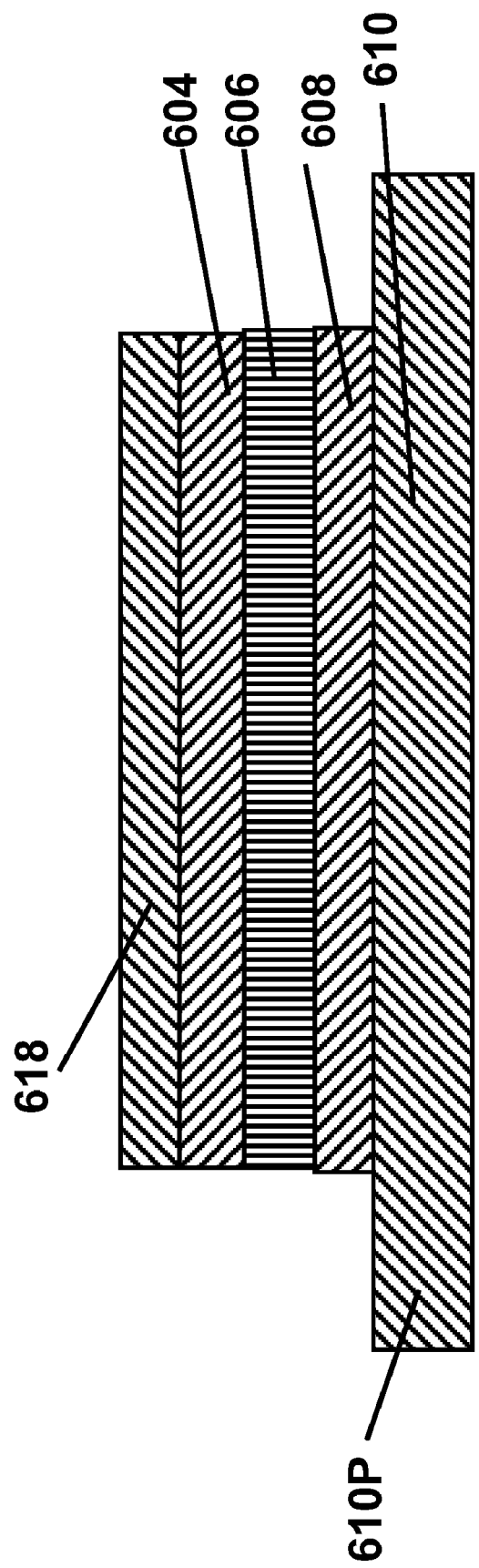
Figure 6D:
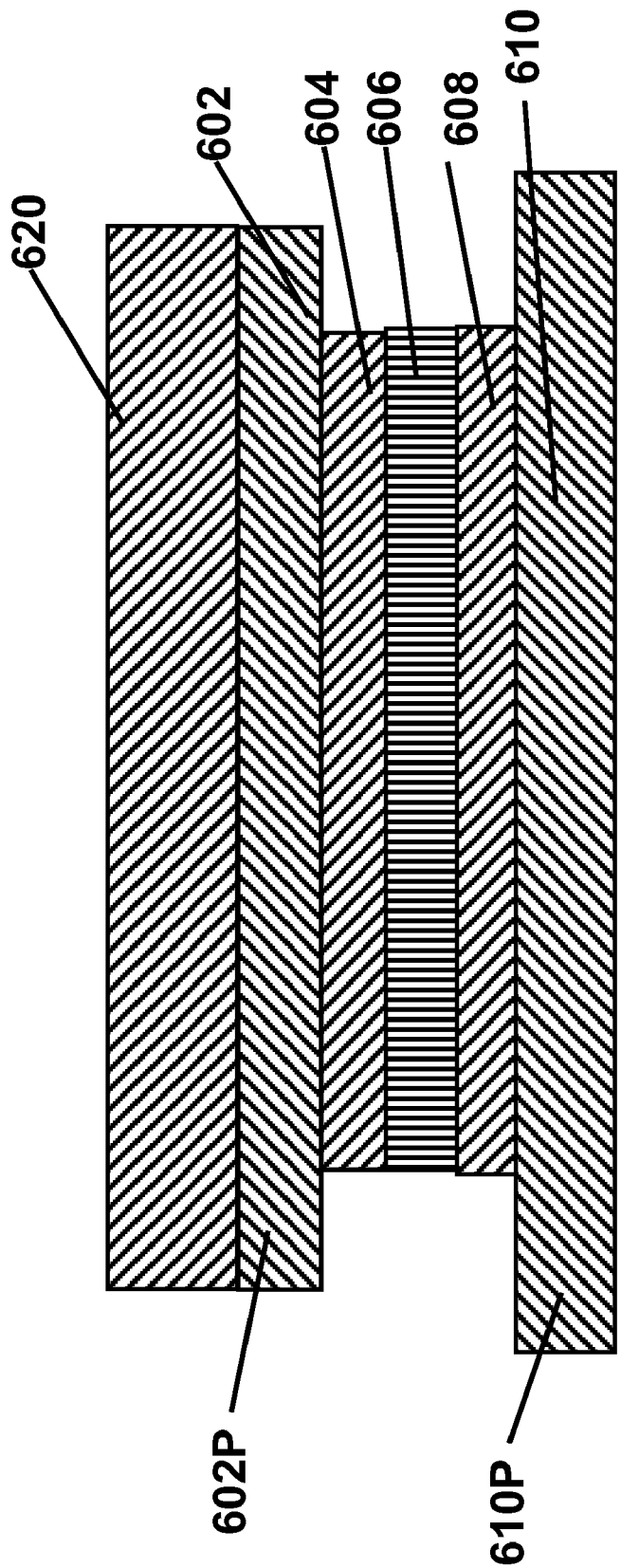
Figure 6E:
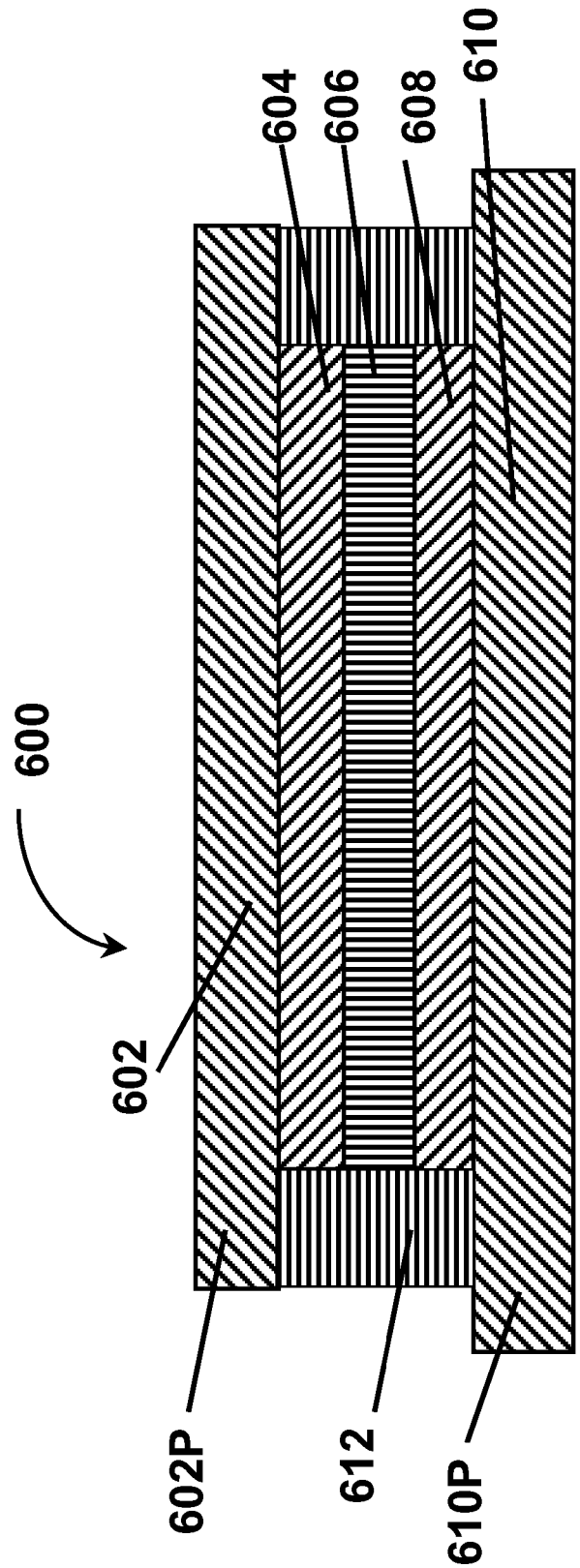

In the next step of the process, a web of the front substrate 602 is secured to a web of a stiffening layer 620, the resultant composite web is cut to produce a piece with the size required for front substrate 602 in FIG. 6E, the sixth release sheet 618 is removed from the structure shown in FIG. 6C, and the front substrate 602 is laminated to adhesive layer 604 to produce the structure shown in FIG. 6D. At this point, the material required to form the edge seal 612 can be dispensed between the peripheral portions 602P and 610P, and cured to form the edge seal 612 shown the FIG. 6E. The stiffening layer 620 can then be removed to form the final electro-optic display 600.

Obviously, numerous variations of the above process are possible. For example, in the above process each layer is added separately to the stack of layers formed on the backplane 610. However, it is possible to assemble a series of layers of the same size separately, and then to add this series of layers to the stack in a single lamination operation. For example, in the process shown in FIGS. 6A to 6E, the lower adhesive layer 608, the electro-optic layer 606 and the upper adhesive layer 604 could all be prepared in the form of webs as already described, the separate webs laminated together after removing one release sheet from each web, and pieces only cut to size after all three layers had been laminated together.

It will be appreciated that, in the processes described above in which a single layer of the final display is prepared in the form of a web sandwiched between two release sheets which are later removed from the central layer at different times, the two release sheets need to have asymmetric characteristics, i.e., different degrees of adhesion to the central layer, so that one of the release sheets can be removed without disturbing the other. The provision of such release sheet pairs with asymmetric characteristics is well within the level of skill in the art, as described for example in the aforementioned 2004/0155857.

The displays of the present invention may incorporate any known type of edge seal, including any of the types of edge seal described in the aforementioned copending application Ser. No. 11/612,732. The displays of the present invention may also incorporate any of the known types of additional sealing layers to isolate the electro-optic medium from the environment, as discussed in Section A above.

The processes described above allow electro-optic displays to be manufactured using laminations with tight tolerances, as required for many active matrix applications. The processes may also, in some cases, facilitate the formation of edge seals.

The electrode arrangements in the displays of all aspects of the present invention can be of any of the types described in the aforementioned E Ink and MIT patents and applications. Thus, for example, the displays may be of the direct drive type, in which the backplane is provided with a plurality of electrodes, each of which is provided with a separate connector by means of a which a controller can control the voltage applied to the specific electrode. In such a direct drive display, a single continuous front electrode is usually provided covering the whole display, although other front electrode arrangements are possible. Depending upon the type of electro-optic material used, it may be possible to use a passive matrix drive arrangement in which (typically) the backplane carries a plurality of elongate parallel electrodes ("column electrodes"), while on the opposed side of the electro-optic material there is provided a plurality of elongate parallel electrodes ("row electrodes") running at right angles to the column electrodes, the overlap between one specific column electrode and one specific row electrode defining one pixel of the display. The present displays may also be of the active matrix type, typically with a single continuous front electrode covering the whole display and a matrix of pixel electrodes on the backplane, each pixel electrode defining one pixel of the display and having an associated transistor or other non-linear element, the active matrix display being scanned in the conventional manner to write the display in a row-by-row fashion. Finally, the present display may also be of the stylus-driven type. with (typically) a single electrode on the backplane and no permanent front electrode, writing of the display being effected by moving a stylus across the front surface of the display.

It will be apparent to those skilled in the technology of electro-optic displays that numerous changes and modifications can be made in the preferred embodiments of the present invention already described without departing from the scope of the invention. Accordingly, the whole of the foregoing description is to be construed in an illustrative and not in a limitative sense.

The invention claimed is:

1. A process for the production of a front plane laminate for use in an electro-optic display, the process comprising:
   forming a sub-assembly comprising a layer of lamination adhesive and a layer of electro-optic medium;
   forming an aperture through said sub-assembly; and
   thereafter securing to exposed surface of the layer of lamination adhesive of said sub-assembly a light-transmissive electrode layer, the electrode layer extending across the aperture.

2. A process according to claim 1, wherein the aperture extends to an edge of the layers of lamination adhesive and electro-optic medium so that the aperture is in the form of a cut-out from this edge.

3. A process according to claim 1, wherein the aperture is completely surrounded by the layers of lamination adhesive and electro-optic medium.

4. A process according to claim 1, wherein the sub-assembly further comprises at least one release sheet covering at least one of the exposed surfaces of the layer of lamination adhesive and the layer of electro-optic medium.

5. A process according to claim 4, wherein the aperture extends through the at least one release sheet.

6. A process according to claim 1, wherein the light-transmissive electrode layer is carried on a support layer.

7. A process according to claim 1, wherein the sub-assembly comprises first and second layers of lamination adhesive disposed on opposed sides of the layer of electro-optic medium, and the aperture extends through both the first and second layers of lamination adhesive.

8. A process according to claim 1, wherein the light-transmissive electrode layer is larger in both dimensions than the layer of electro-optic medium.

9. A process according to claim 1, wherein, after the light-transmissive electrode layer has been secured to the layer of lamination adhesive, the sub-assembly is laminated to a backplane comprising at least one electrode, a conductive material being introduced into the aperture during this lamination so as to provide an electrical connection between the light-transmissive electrode layer and a contact provided on the backplane.

10. A process according to claim 1, wherein the electro-optic medium layer comprises a rotating bichromal member or electrochromic material.

11. A process according to claim 1, wherein the electro-optic medium layer comprises an electrophoretic material comprising a plurality of electrically charged particles disposed in a fluid and capable of moving through the fluid under the influence of an electric field.

12. A process according to claim 11, wherein the electrically charged particles and the fluid are confined within a plurality of capsules or microcells.

13. A process according to claim 11, wherein the electrically charged particles and the fluid are present as a plurality of discrete droplets surrounded by a continuous phase comprising a polymeric material.

14. A process according to claim 11, wherein the fluid is gaseous.

15. A process for the production of a front plane laminate for use in an electro-optic display, the process comprising:
   forming a sub-assembly comprising a layer of lamination adhesive and a layer of electro-optic medium; and
   thereafter securing to exposed surface of the layer of lamination adhesive of said sub-assembly a light-transmissive electrode layer, the electrode layer having a tab portion which extends beyond the periphery of the layers of lamination adhesive and electro-optic medium.

16. A process according to claim 15, wherein the electrode layer is larger in both dimensions than the layer of electro-optic medium.

17. A process according to claim 15, wherein the sub-assembly further comprises at least one release sheet covering at least one of the exposed surfaces of the layer of lamination adhesive and the layer of electro-optic medium.

18. A process according to claim 15, wherein the light-transmissive electrode layer is carried on a support layer.

19. A process according to claim 15, wherein the sub-assembly comprises first and second layers of lamination adhesive disposed on opposed sides of the layer of electro-optic medium.

20. A process according to claim 15, wherein, after the light-transmissive electrode layer has been secured to the layer of lamination adhesive, the sub-assembly is laminated to a backplane comprising at least one electrode, with the tab portion being contacted with a contact provided on the backplane.

21. A process according to claim 15, wherein the electro-optic medium layer comprises a rotating bichromal member or electrochromic material.

22. A process according to claim 15, wherein the electro-optic medium layer comprises an electrophoretic material comprising a plurality of electrically charged particles disposed in a fluid and capable of moving through the fluid under the influence of an electric field.

23. A process according to claim 22, wherein the electrically charged particles and the fluid are confined within a plurality of capsules or microcells.

24. A process according to claim 22, wherein the electrically charged particles and the fluid are present as a plurality of discrete droplets surrounded by a continuous phase comprising a polymeric material.

25. A process according to claim 22, wherein the fluid is gaseous.

26. A process for forming a flexible electro-optic display, the process comprising:

provided a flexible backplane comprising at least one electrode;

providing a flexible front plane laminate comprising a flexible light-transmissive electrically-conductive layer; a flexible layer of a solid electro-optic medium; a flexible adhesive layer and a release sheet;

removing the release sheet from the front plane laminate; and laminating the front plane laminate to the backplane to form an electro-optic display, wherein a stiffening layer is secured to at least one of the front plane laminate and the backplane prior to the lamination, the stiffening layer serving to increase the stiffness of the front plane laminate and/or backplane.

27. A process according to claim 26, wherein the stiffening layer is removed after the lamination.

28. A stiffened front plane laminate comprising, in order, a stiffening layer, a light-transmissive electrically-conductive layer; a layer of a solid electro-optic medium in electrical contact with the electrically-conductive layer; an adhesive layer and a release sheet, the stiffening layer being removable from the electrically-conductive layer.

29. An electro-optic display comprising a backplane having at least one electrode; a first layer of non-cross-linked adhesive in contact with the backplane; a second layer of cross-linked adhesive on the opposed side of the first layer from the backplane; and a layer of electro-optic medium on the opposed side of the second layer from the first layer.

30. An electronic book reader, portable computer, tablet computer, cellular telephone, smart card, sign, watch, shelf label or flash drive comprising a display according to claim 29.

31. A front plane laminate comprising, in order, a light-transmissive electrically-conductive layer; a layer of an electro-optic medium; a layer of cross-linked adhesive; a layer of non-cross-linked adhesive; and a release sheet.

32. A double release film comprising:

a layer of a solid electro-optic medium having first and second surfaces on opposed sides thereof;

a first adhesive layer on the first surface of the layer of solid electro-optic medium;

a second adhesive layer on the second surface of the layer of solid electro-optic medium; and a release sheet disposed on the opposed side of the first adhesive layer from the layer of solid electro-optic medium, wherein one of the first and second adhesive layers comprises a first sub-layer of cross-linked adhesive adjacent the surface of the layer of solid electro-optic medium, and a second sub-layer of non-cross-linked adhesive.

* * * * *